(12) United States Patent
Velez Lopez et al.

(10) Patent No.: US 11,810,680 B2
(45) Date of Patent: Nov. 7, 2023

(54) MODULAR INTEGRATED GAS HIGH TEMPERATURE NUCLEAR REACTOR

(71) Applicant: BOSTON ATOMICS, LLC, Boston, MA (US)

(72) Inventors: Enrique Velez Lopez, Madrid (ES); William Robb Stewart, Boston, MA (US)

(73) Assignee: BOSTON ATOMICS, LLC, Boston, MA (US)

( * ) Notice: Subject to any disclaimer, the term of this patent is extended or adjusted under 35 U.S.C. 154(b) by 0 days.

(21) Appl. No.: 17/067,425

(22) Filed: Oct. 9, 2020

(65) Prior Publication Data

US 2021/0110944 A1    Apr. 15, 2021

Related U.S. Application Data

(60) Provisional application No. 62/913,215, filed on Oct. 10, 2019.

(51) Int. Cl.
*G21C 1/32*    (2006.01)
*G21C 15/253*    (2006.01)
(Continued)

(52) U.S. Cl.
CPC ............. *G21C 15/253* (2013.01); *G21C 1/08* (2013.01); *G21C 11/028* (2013.01); *G21C 11/08* (2013.01);
(Continued)

(58) Field of Classification Search
CPC ................................ G21D 1/003; G21C 1/326
See application file for complete search history.

(56) References Cited

U.S. PATENT DOCUMENTS 2,946,732 A * 7/1960 Wootton ................. G21C 11/02
376/389
3,395,076 A * 7/1968 Ruppen, Jr. ............. G21C 1/326
976/DIG. 10

(Continued)

FOREIGN PATENT DOCUMENTS

DE    2921750 A1 * 11/1980
EP    2238598 A2 * 10/2010    .............. F22B 1/063

*Primary Examiner* — Lily C Garner
(74) *Attorney, Agent, or Firm* — Grossman, Tucker, Perreault & Pfleger, PLLC

(57) ABSTRACT

The present disclosure is directed to systems and methods useful for the construction and operation of a Modular Integrated Gas High-Temperature Reactor (MIGHTR). The MIGHTR includes a reactor core assembly disposed at least partially within a core baffle within a first high-pressure shell portion, a thermal transfer assembly disposed at least partially within a flow separation barrel within a second high-pressure shell portion. The longitudinal axes of the first high-pressure shell portion and the second high-pressure shell portion may be collinear. The reactor core assembly may be accessed horizontally for service, maintenance, and refueling. The core baffle may be flexibly displaceably coupled to the flow separation barrel. Coolant gas flows through the reactor core assembly and into the thermal transfer assembly where the temperature of the coolant gas is reduced. A plurality of coolant gas circulators circulate the cooled coolant gas from the thermal transfer assembly to the reactor core assembly.

31 Claims, 10 Drawing Sheets

(51) Int. Cl.
*G21C 1/08* (2006.01)
*G21C 11/02* (2006.01)
*G21C 13/028* (2006.01)
*G21C 13/00* (2006.01)
*G21C 21/00* (2006.01)
*G21C 13/10* (2006.01)
*G21C 11/08* (2006.01)

(52) U.S. Cl.
CPC ........... *G21C 13/00* (2013.01); *G21C 13/028* (2013.01); *G21C 13/10* (2013.01); *G21C 21/00* (2013.01); *G21C 1/326* (2013.01)

(56) References Cited

U.S. PATENT DOCUMENTS

| | | | | |
|---|---|---|---|---|
| 3,461,034 A * | 8/1969 | Fortescue | ............... | G21C 1/326 976/DIG. 10 |
| 3,775,248 A * | 11/1973 | Charcharos | ............ | G21C 1/326 376/393 |
| 4,038,134 A * | 7/1977 | Dorner | ................ | G21C 11/088 376/288 |
| 4,554,129 A * | 11/1985 | Peinado | ................. | G21C 1/322 376/393 |
| 4,652,418 A * | 3/1987 | Baric | .................... | G21C 13/067 976/DIG. 176 |
| 4,689,194 A * | 8/1987 | Wachholz | .............. | G21C 15/18 376/381 |
| 4,847,040 A * | 7/1989 | Becker | ................ | G21C 15/253 976/DIG. 203 |
| 4,909,981 A * | 3/1990 | Garabedian | .............. | G21C 1/03 376/293 |
| 5,999,584 A * | 12/1999 | Adams | ................ | G21C 19/207 376/268 |
| 9,343,187 B2 * | 5/2016 | Ales | ....................... | G21C 1/322 |
| 10,497,482 B2 * | 12/2019 | Keller | .................... | G21C 19/18 |

* cited by examiner

MODULAR INTEGRATED GAS HIGH TEMPERATURE NUCLEAR REACTOR

TECHNICAL FIELD

The present disclosure relates to reactor design, more specifically to horizontal nuclear reactors.

BACKGROUND

Capital cost correlates best with the scope of the work to be performed at the construction site (excavation, civil works, component installation, etc.). Therefore, nuclear power plant structures need a reduction in size per kW, to compete with lower cost natural gas and renewable energy options. Nuclear power plant innovation should center around a design that adapts to today's safety and security requirements while minimizing development, construction, and infrastructure requirements.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
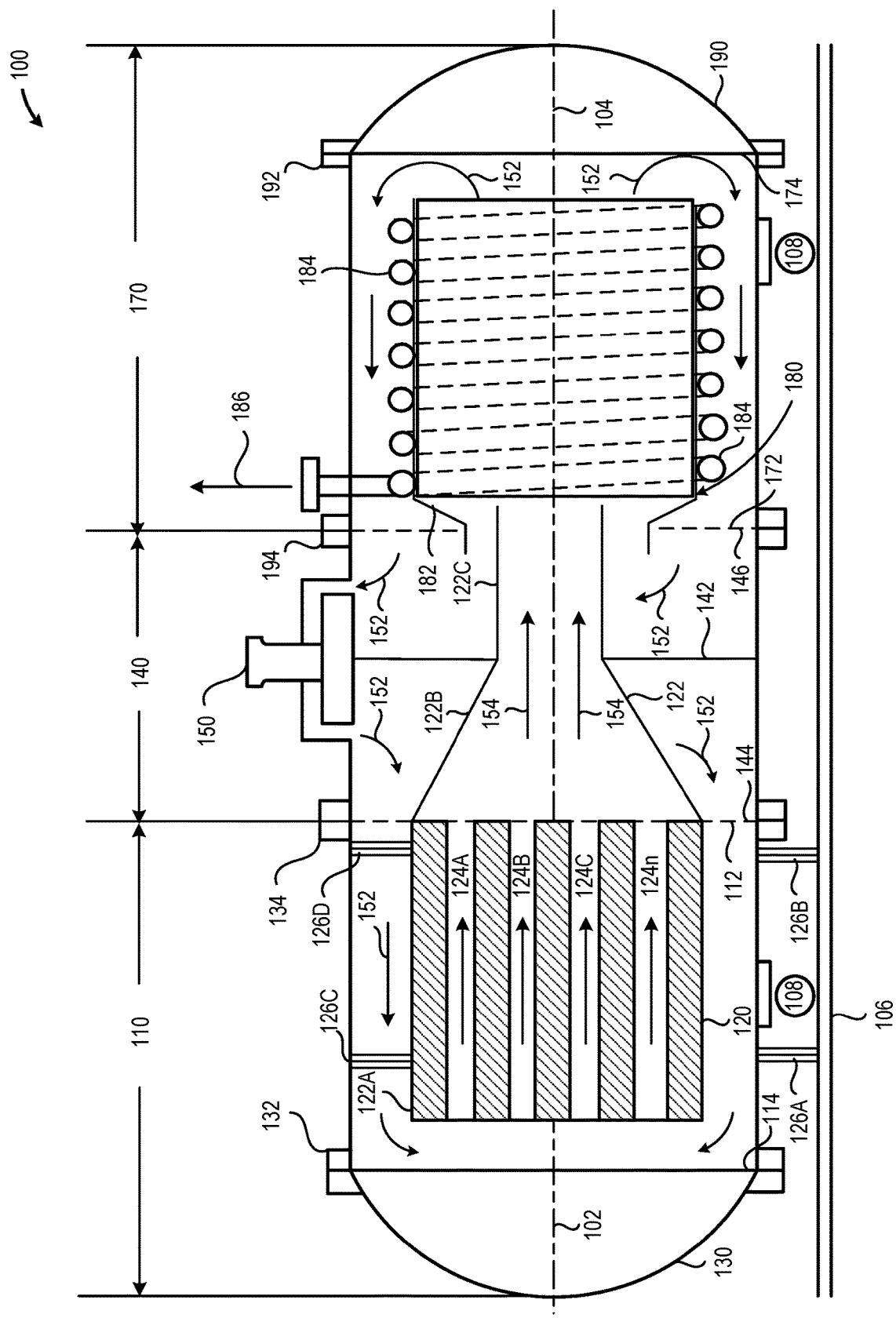
FIG. 1 depicts a cross-sectional elevation of an illustrative Modular Integrated Gas High-Temperature Reactor (MIGHTR) that includes a first high-pressure shell portion that includes a reactor core assembly disposed at least partially within a core barrel, an intermediate high-pressure shell portion, and a second high-pressure shell portion that includes a thermal transfer assembly disposed at least partially within a flow separation barrel, and one or more coolant gas circulators disposed at least partially within the intermediate high-pressure shell portion to transfer coolant gas from the second high-pressure shell portion to the first high-pressure shell portion, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

A Modular Integrated Gas High Temperature Reactor (MIGHTR) is an inherently safe reactor that can provide all the services typical of a conventional high temperature gas reactor (HTGR): efficient and flexible electricity generation, process heat and district heating. Beneficially, the MIGHTR described herein reduces the building size over a conventional HTGR more than 20%, on a per unit kW basis. As opposed to the vertical, side-by-side orientation of the reactor core and steam generator typical of the HTGR design, the primary MIGHTR components are positioned along a common horizontal axis, typically such that the longitudinal axis of the reactor core assembly substantially aligns with the longitudinal axis of the thermal transfer assembly.

The MIGHTR system includes a multi-piece, high-pressure, shell that includes three portions: a first high-pressure shell portion to accommodate the insertion of the reactor core assembly, a second high-pressure shell portion to accommodate the insertion of a thermal transfer assembly and, in at least some embodiments, an intermediate high-pressure shell portion that physically couples the first high-pressure shell portion and the second high-pressure shell portion and facilitates the flow of gaseous coolant through the MIGHTR system. Some or all of the MIGHTR high-pressure shell portions may be supported by a linear transport system, such as rollers on rails in the axial direction or a sliding support in the axial direction, to facilitate disassembly and reassembly of the first, second, and intermediate high-pressure shell portions. The first, second, and intermediate high-pressure shell portions include physical connection features, such as flanges that permit the assembly and disassembly of the high-pressure shell. The use of a modular high-pressure shell and transport system beneficially facilitates fuel replacement and maintenance operations, while eliminating the necessity of overhead cranes and their associated complexity and oversize reactor building height requirement. The superior efficiency in space utilization stems from removal of the cross vessel and the associated space utilization of that layout, removal of the overhead crane and its space utilization and the removal of floors and stairs while retaining full access to every part of the MIGHTR system. The reduced building height reduces cost and construction time and complexity. The horizontal arrangement of the reactor high-pressure shell permits placement of the MIGHTR system in a covered trench, an above grade classical concrete building, a surface mounted building, i.e., covered by soil or a silo-type cavity in rock, adaptable to site conditions. In the MIGHTR, the relatively hot coolant gas flows from the reactor core assembly into the thermal transfer assembly. One or more recirculators may be disposed at least partially within the MIGHTR to scavenge the relatively cool coolant gas from the thermal transfer assembly and return the relatively cool coolant gas to the reactor core assembly.

The systems disclosed herein feature a horizontally arranged and aligned reactor assembly and thermal transfer assembly that permits the horizontal extraction of the reactor core assembly from the first high-pressure shell portion and/or the horizontal extraction of the thermal transfer assembly from the second high-pressure shell portion, for example using a series of support rollers or sliding supports physically coupled to the high-pressure shell that are positioned to travel along a common line in space, for example along guide rails disposed in or on the surface inside the reactor high-pressure shell. Additionally, the high-pressure shell is supported on another series of support rollers or sliding supports that allow the high-pressure shell to travel along the same line in space. The use of such rollers and guide structures facilitate assembly, disassembly, alignment, and mounting of the first high-pressure shell portion, the second high-pressure shell portion, and, when present, the intermediate high-pressure shell portion. The reactor core assembly and the thermal transfer assembly may be individually removeable for repair, replacement, or maintenance. The reactor core assembly may rest on the bottom of the first high-pressure shell portion or on supports that limit azimuthal displacement of the reactor core assembly within the first high-pressure shell portion or on supports that limit azimuthal displacement of the reactor core assembly within the first high-pressure shell portion. Beneficially, the axial displacement of the reactor core assembly may be restrained in a single location at the line of movement thereby permitting axial expansion in every other support location. Likewise, the axial displacement of the high-pressure shell may be restrained in a single location at the line of movement thereby permitting axial expansion in every other support location.

The intermediate high-pressure shell portion may include radiation insulation for gamma and neutrons. The intermediate high-pressure portion includes one or more internal structures to: first, direct the flow of relatively warm cooling gas from the reactor core assembly into a flow separation barrel within the thermal transfer assembly; and second, to direct the flow of the relatively cool coolant gas to the gas circulator. The intermediate high-pressure shell portion couples between the first high-pressure shell portion and the second high-pressure shell portion. Radiation insulation may be disposed within at least a portion of the intermediate high-pressure shell portion. Such radiation insulation may take the form of rigid or semi-rigid blocks having channels formed therein to permit the flow of a coolant gas such as helium through at least a portion of the radiation insulation.

The coolant gas may include an inert gas (such as helium or a helium-containing mixture) or an inert gas mixture. The coolant gas passes through the reactor core assembly where the temperature of the coolant gas increases from a relatively cool first, or inlet, temperature to a relatively warm second, or outlet, temperature. Coolant gas circulators may be disposed at various locations within the high-pressure shell. For example, one or more coolant gas circulators may be disposed at least partially within the intermediate high-pressure shell portion (see, e.g., FIG. 1) or at least partially within the second high-pressure shell portion (see, e.g., FIG. 2). The coolant gas circulators transfer coolant gas from the second high-pressure shell portion to the intermediate high-pressure shell portion and/or the first high-pressure shell portion.

Internally, the reactor core assembly may be disposed at least partially within a core barrel. In some implementations, the core barrel may be fabricated using a Hastelloy alloy. The core barrel may extend continuously from the reactor core assembly, gradually tapering to a hollow cylindrical shape to direct the relatively warm cooling gas into the internal shell within the thermal transfer assembly. The tapered portion of the core barrel provides a generally funnel-shaped construction that beneficially and advantageously mitigates the detrimental effect of rupture of a fluid conduit in the thermal transfer assembly in allowing the cooling fluid (thermal transfer media, boiler feedwater, etc.) the reactor core assembly and permits a better radiation insulation of the secondary coolant.

The flow separation barrel within the thermal transfer assembly terminates in a tapered, or funnel shaped, section having a slightly larger diameter than the tapered portion of the core barrel. The tapered portion of the core barrel may be inserted, at least partially, within the tapered portion of the flow separation barrel. The fluid conduits used in the thermal transfer assembly may be disposed in, on, or about the flow separation barrel which, in turn, provides support for the fluid conduits. Beneficially, the physical couplings between the first high-pressure shell portion/intermediate high-pressure shell portion and between the second high-pressure shell portion/intermediate high-pressure shell portion may be disassembled and the various high-pressure shell portions moved along rails positioned in or on the surface beneath the high-pressure shell to perform assembly, refueling, maintenance, and/or repair operations. A prismatic block fuel handling machine with a horizontal arm may be used to extract and replace some or all of the fuel assemblies in the reactor core assembly during reloading.

A modular integrated gas high-temperature reactor is provided. The reactor may include: a first high-pressure shell portion having a substantially horizontal first longitudinal axis, the first high-pressure shell portion to accommodate a slidable insertion of at least a portion of a reactor core assembly disposed at least partially in a core barrel, such that in operation the coolant gas enters the reactor core assembly at a first temperature and exits the reactor core assembly at a second temperature greater than the first temperature; a second high-pressure shell portion having a substantially horizontal second longitudinal axis, the second high-pressure shell portion to accommodate insertion of at least portion of a thermal transfer assembly disposed at least partially in a flow separation barrel to receive the coolant gas at the second temperature from the reactor core assembly and cool the coolant gas to the first temperature; and at least one coolant gas circulator to receive the coolant gas at the first temperature and cause the coolant gas to return to the reactor core assembly.

A high temperature gas reactor system is provided. The system may include: a first high-pressure shell portion having a substantially horizontal first longitudinal axis, the first high-pressure shell portion to accommodate a slidable insertion of at least a portion of a reactor core assembly disposed at least partially in a core barrel, such that in operation the coolant gas enters the reactor core assembly at a first temperature and exits the reactor core assembly at a second temperature greater than the first temperature; a second high-pressure shell portion having a substantially horizontal second longitudinal axis, the second high-pressure shell portion to accommodate insertion of at least portion of a thermal transfer assembly disposed at least partially in a flow separation barrel to receive the coolant gas at the second temperature from the reactor core assembly and cool the coolant gas to the first temperature; at least one coolant gas circulator to receive the coolant gas at the first temperature and cause the coolant gas to return to the reactor core assembly; and one or more support elements coupled to at least one of the first high-pressure shell portion and the second high-pressure shell portion, the one or more support elements to permit the axial displacement of at least one of: the first high-pressure shell portion along the first longitudinal axis and the second high-pressure shell portion along the second longitudinal axis.

A method of assembling a high temperature gas reactor system is provided. The method may include: axially displacing a first high-pressure shell portion along a substantially horizontal first longitudinal axis, the first high-pressure shell portion including: at least a portion of a reactor core assembly disposed at least partially in a core barrel; and a first support element physically coupled to the first high-pressure shell portion, the first support element displaceable with respect to at least a portion of an underlying support structure disposed beneath the first high-pressure shell portion; axially displacing a second high-pressure shell portion along a substantially horizontal second longitudinal axis, the second high-pressure shell portion including: at least portion of a thermal transfer assembly disposed at least partially in a flow separation barrel; and a second support element physically coupled to the second high-pressure shell portion, the second support element displaceable with respect to at least a portion of the underlying support structure disposed beneath the second high-pressure shell portion.

The following Detailed Description references the accompanying drawings which form a part this application, and which show, by way of illustration, specific example implementations. Other implementations may be made without departing from the scope of the disclosure.

As used herein the term "substantially horizontal" refers to an object, dimension, or axis that is within +/−15° of an inclination of 0° (i.e., within +/−15° of true horizontal). Thus a longitudinal axis of a high-pressure shell portion that is referred to as "substantially horizontal" may form an angle of anywhere between −15° to +15° measured with respect to a horizontal support structure beneath the high-pressure shell portion.

FIG. 1 depicts a cross-sectional elevation of an illustrative Modular Integrated Gas High-Temperature Reactor (MIGHTR) 100 that includes a first high-pressure shell portion 110 that includes a reactor core assembly 120 disposed at least partially within a core barrel 122, an intermediate high-pressure shell portion 140, and a second high-pressure shell portion 170 that includes a thermal transfer assembly 180 disposed at least partially within a flow separation barrel 182, and one or more coolant gas circulators 150 disposed at least partially within the intermediate high-pressure shell portion to transfer coolant gas from the second high-pressure shell portion 170 to the first high-pressure shell portion 110, in accordance with at least one embodiment described herein. As depicted in FIG. 1 the reactor core assembly 120 includes a plurality of coolant gas flow channels 124A-124n through which an inert coolant gas passes. The coolant gas enters the reactor core assembly 120 as a relatively cool coolant gas 152 at a first temperature ($T_1$) and exits as a relatively warm coolant gas 154 at a second temperature ($T_2$). The relatively warm coolant gas 154 flows through the tapered portion of the core barrel 122. The flow separation barrel 182 receives the relatively warm coolant gas 154.

Within the thermal transfer assembly 180, the heat carried by the relatively warm coolant gas 154 increases the temperature of and/or vaporizes thermal transfer media circulating in or passing through one or more fluid conduits 184 thereby cooling the relatively warm coolant gas 154. In at least some embodiments, the thermal transfer fluid may include boiler feedwater and the heat removed from the relatively warm coolant gas 154 may cause at least a portion of the boiler feedwater to boil, generating a flow of superheated steam 186 from the thermal transfer assembly 180. Increasing the temperature of and/or vaporizing the thermal transfer media within the thermal transfer assembly 180 cools the relatively warm coolant gas 154 to produce the relatively cool coolant gas 152 exiting the thermal transfer assembly 180. The relatively cool coolant gas 152 flows into the intermediate high-pressure shell portion 140 where a baffle 142 prevents the flow of the relatively cool coolant gas 152 into the first high-pressure shell portion 110. Instead, one or more coolant gas circulators 150A-150n (collectively, "external coolant gas circulators 150") disposed at least partially within the intermediate high-pressure shell portion 140 to draw the relatively cool coolant gas 152 from the thermal transfer assembly side of the baffle 142 to the reactor core assembly side of the baffle 142. In embodiments, the thermal transfer assembly 180 may include a flow separator to divert the flow of cooling gas 154 from the reactor core assembly 120 to flow along the walls of the flow separation barrel 182. In such instances, the flow separator may be installed either on the outer pressure boundary or on the beams supporting the one or more fluid conduits 184.

In embodiments, the reactor core assembly 120 may include a secondary cooling system as a failsafe. In such embodiments, the failsafe cooling system may be disposed external to the MIGHTR 100. For example, in some embodiments, a passive water cooling system may be used to deluge the external surfaces of the high-pressure shell, including all or a portion of one or more of: the first high-pressure shell portion 110, the intermediate high-pressure shell portion 140, and/or the second high-pressure shell portion 170 in the event of undesirable operation within the reactor core assembly 120. In such embodiments, a water tank may be disposed above the MIGHTR 100. In yet other embodiments, one or more fans, blowers, or similar fluid movers may be used as a failsafe to move one or more coolant gases or liquids through the reactor core assembly 120 such auxiliary cooling system may also provide protection for the reactor core assembly 120 in the event of undesirable operation within the reactor core assembly 120.

In embodiments, a plurality of stand-off members, such as finger members 126A-126n (two depicted in FIG. 1, 126A and 126B, collectively, "finger members 126") may be used to space the core barrel 122 a distance from the inside wall of the first high-pressure shell portion 110. In some embodiments, the finger members 126 may be affixed to the external surface of the core barrel 122 and may be slidably displaceable along the inside of the first high-pressure shell portion 110. In other embodiments the finger members 126 may be affixed to the internal surface of the first high-pressure shell portion 110 and may be slidably displaceable along the external surface of the core barrel 122.

In embodiments, one or more rollers 108 or similar elements allowing the displacement of the first high-pressure shell portion 110, the intermediate high-pressure shell portion 140, and/or the second high-pressure shell portion 170 may be operably coupled to the MIGHTR 100. The rollers 108 may be guided along rails or similar structures 106 disposed in the support surface or floor beneath the MIGHTR 100. The use of rollers 108 and rails 106 beneficially facilitates routine servicing, maintenance, and refueling of the reactor core assembly 120. Advantageously, the horizontal construction of the MIGHTR 100 reduces or even eliminates the need for overhead cranes to conduct or perform such servicing, maintenance, and refueling operations, thereby reducing the overall height of the structure housing the MIGHTR 100. The superior efficiency in space utilization through results from the removal of the cross vessel and the associated space utilization of that layout, the removal of the overhead crane and its space utilization and the removal of floors and stairs to have access to every part of the MIGHTR 100. The reduced height of the building (compared to conventional, vertical, reactor construction reduces construction time, complexity and cost. In embodiments, the reactor hall may be placed on a covered trench, an above grade classical concrete building, a surface mounted building, e.g., covered by soil or a silo-type cavity in rock, adaptable to site conditions.

In embodiments, the coolant gas may include any number and/or combination of inert gases. In at least some embodiments, the coolant gas may include helium or an inert gas mixture containing or including helium. For example, the coolant gas may have a helium content of about: 50% by volume or greater; 60% by volume or greater; 70% by volume or greater; 80% by volume or greater; 90% by volume or greater; 95% by volume or greater; or 99% by volume or greater.

In embodiments, the first high-pressure shell portion 110 may include a hollow, generally cylindrical, vessel disposed along a longitudinal axis 102, a first end 112 disposed proximate the intermediate high-pressure shell portion 140 and a second end 114 opposite the first end 112. A head 130 or similar structure may be attachable to the second end 114 of the first high-pressure shell portion 110. In at least some embodiments, one or more flanges 132 may be used to physically couple the head 130 to the first high-pressure shell portion 110. The use of a detachable head 130 beneficially permits the extraction of the reactor core assembly 120 from the first high-pressure shell portion 110 for service, maintenance, and/or refueling. The first high-pressure shell portion 110 may have any diameter. In embodiments, the first high-pressure shell portion 110 may have a diameter of about: 3 feet or greater; 5 feet or greater; 10 feet or greater; 15 feet or greater; 20 feet or greater; or 30 feet or greater. In some instances, the diameter of the first high-pressure shell portion 110 may be reduced to reduce the likelihood of flooding of the core. In embodiments, the reactor core assembly 120 may be positioned proximate the bottom or lower surface of the first high-pressure shell portion 110.

The reactor core assembly 120 is a gas cooled core that includes fuel rods, moderators, and neutron absorbing control rods that may be inserted to limit or control the rate of heat generation (i.e., the rate of fission) within the reactor core. The reactor core assembly 120 includes a plurality of coolant gas flow channels 124A-124n (collectively, "coolant gas flow channels 124") that permit the passage of a gaseous coolant (e.g., helium) through the reactor core to cool the reactor core. In embodiments, the relatively cool coolant gas 152 enters the reactor core assembly at the first temperature and exits as a relatively warm coolant gas 154 at a second temperature that is greater than the first temperature. The reactor core assembly 120 includes a core grid 128 disposed proximate the reactor core assembly 120. The core grid 128 provides a stop for the fuel elements in the horizontal (i.e., along/parallel to the longitudinal axis 104). In embodiments, each of the fuel elements may include a prismatic member that includes fissile material distributed in a graphite matrix. Each prismatic member includes a plurality of flow channels to permit the passage of the relatively cool coolant gas 152 through the prismatic member. The reactor core assembly 120 may be sized to provide any desired electrical or power generation capacity. For example, the reactor core assembly 120 may be sized to produce a power output of from about 20 MWt to about 600 MWt.

In embodiments, the core barrel 122 may include a number of sections. The core barrel 122 may include a first, relatively large diameter, hollow, cylindrical portion 122A that at least partially surrounds the reactor core assembly 120, providing strength, structural support, and rigidity to the reactor core assembly 120. The core barrel 120 may additionally include a hollow tapered, or frustoconical, portion 122B that reduces the diameter of the core barrel from the first, relatively large diameter to a second, relatively smaller, diameter. The core barrel 120 may further include a second, relatively smaller diameter, hollow, cylindrical portion 122C that extends at least partially into the flow separation baffle 182. The first, relatively large diameter, hollow, cylindrical portion 122A may have any diameter. In embodiments, the first, relatively large diameter, hollow, cylindrical portion 122A may have a diameter of about: 3 feet or greater; 5 feet or greater; 10 feet or greater; 15 feet or greater; 20 feet or greater; 25 feet or greater; 30 feet or greater; or 35 feet or greater. In embodiments, the second, relatively smaller diameter, hollow, cylindrical portion 122C may have a diameter of about: 1 foot or greater; 3 feet or greater; 5 feet or greater; 7 feet or greater; 10 feet or greater; or 15 feet or greater. The frustoconical portion 122B has a base diameter equal to the diameter of the first cylindrical portion 122A, an apex diameter equal to the diameter of the second cylindrical portion 122B, and any height. In embodiments, the frustoconical portion 122B may have a height of about: 1 foot or greater; 2 feet or greater, 5 feet or greater, 10 feet or greater; or 15 feet or greater.

In embodiments, the core barrel 122 and the reactor core assembly 120 may be displaceable with respect to the first high-pressure shell portion 110. Such displaceability beneficially permits the full or partial removal of either or both the reactor core assembly 120 and/or the core barrel 122 from the first high-pressure shell portion 110 to more easily perform service, maintenance, or fuel replacement operations. In embodiments, the core barrel 122 may rest on the "bottom" surface of the first high-pressure shell portion 110. In other embodiments, one or more rollers, slides, or similar structures may be disposed between the external face of first cylindrical portion 122A of the core barrel 120 and the internal face of the first high-pressure shell portion 110 to more easily facilitate the full or partial withdrawal of the reactor core assembly from the first high-pressure shell portion 110. In such embodiments, the one or more rollers, slides, or similar structures may also accommodate the growth and contraction of the core barrel 122 as the reactor core assembly 120 thermally expands and contracts during operation and shutdown. In embodiments, one or more apertures may be disposed in the portion of the core barrel 122 facing the head 130 to permit the flow of coolant gas and halt fuel elements.

Although not depicted in FIG. 1, one or more flow enhancement devices including but not limited to: one or more airfoils, one or more turning vanes, one or more flow straighteners, one or more static mixers, or combinations thereof may be disposed internally within the tapered portion of the core barrel 122. The core barrel 120 beneficially directs the flow of the relatively warm coolant gas 154 into the steam generator assembly 180 to generate steam using thermal energy provided by the relatively warm coolant gas 154. The generation of steam cools the relatively warm coolant gas 154 to provide the relatively cool coolant gas 152 for recycle to the reactor core assembly 120. In embodiments, the core barrel 122 may be fabricated from one or more materials capable of blocking neutrons and/or gamma radiation.

In embodiments, the longitudinal axis 102 of the first high-pressure shell portion 110 may be aligned (i.e., collinear) with the longitudinal axis 104 of the second high-pressure shell portion 170. In other embodiments, the longitudinal axis of the first high-pressure shell portion 110 may be skew to the longitudinal axis 104 of the second high-pressure shell portion 170. For example, the longitudinal axis 102 of the first high-pressure shell portion 110 may be inclined by about 1° or less; about 2° or less; or about 5° or less with respect to the longitudinal axis of the second high-pressure shell portion 170. Inclining the longitudinal axis 102 of the first high-pressure shell portion 110 with respect to the longitudinal axis 104 of the second high-pressure shell portion 170 beneficially facilitates the full or partial withdrawal of the reactor core assembly 120 from the first high-pressure shell portion 110.

In embodiments, the first high-pressure shell portion 110 may include a head 130 or similar sealing device. A physical coupling device 132 may be used to detachably attach the head 130 to the first high-pressure shell portion 110. In at least some embodiments, the physical coupling device 132 may include a flange physically coupled proximate the second end 114 of the first high-pressure shell portion 110 and a corresponding flange physically coupled to the head 130. Removable fasteners, such as all-thread and nuts or bolts and nuts may be used to detachably attach the head 130 to the first high-pressure shell portion 110. In some instances, threaded fasteners joining the head 130 to the first high-pressure shell portion 110 may be removed, thereby opening the end of the first high-pressure shell portion 110 to permit direct access to the reactor core assembly 120. Thus, the system depicted in FIG. 1 beneficially permits access near ground level for maintaining, servicing, and refueling the reactor core assembly 120. In such instances, a single flange 132A may be fully welded about the perimeter of the first high-pressure shell portion 110 and a complimentary single flange 132B may be fully welded about the perimeter of the head 130.

The first high-pressure shell portion 110 may operate at any temperature and pressure. In embodiments, the first high-pressure shell portion 110 may operate at a pressure of about: 150 pounds per square inch (psi) or less; 300 psi or less; 600 psi or less; 900 psi or less; 1500 psi or less; or 3000 psi or less. In embodiments, the first high-pressure shell portion 110 may operate at a temperature of about: 500° F. or less; 750° F. or less; 1000° F. or less; 1500° F. or less; 2000° F. or less; or 2500° F. or less. In some embodiments, all or a portion of the internal surface of the first high-pressure shell portion 110 may be lined with one or more neutron and/or gamma radiation absorbing materials. The first high-pressure shell portion 110 may be fabricated from one or more materials capable of withstanding the expected operating temperature and pressure while maintaining structural integrity and providing an adequate margin of safety.

The intermediate high-pressure shell portion 140 physically couples the first high-pressure shell portion 110 to the second high-pressure shell portion 170 and thermally couples the reactor core assembly 120 to the steam generator assembly 180. The intermediate high-pressure shell portion 140 includes at least one internal baffle 142 to at least partially physically and fluidly isolate the interior portion of the first high-pressure shell portion 110 surrounding the reactor core assembly 120 from the interior portion of the second high-pressure shell portion 170 surrounding the steam generator assembly 180. The isolation provided by the at least one internal baffle 142 beneficially limits or even eliminates the migration of water, for example water from a boiler feedwater leak in the steam generator assembly 180, from the second high-pressure shell portion 170 to the first high-pressure shell portion 110.

Additionally, the fluid isolation of the first high-pressure shell portion 110 from the second high-pressure shell portion 170 provided by the at least one internal baffle 142 beneficially prevents the coolant gas from "short circuiting"—i.e., passing from the discharge of the core barrel 122 directly back to the reactor core assembly 120 without passing through or around the steam generator assembly 180. In embodiments, the at least one internal baffle 142 may be fabricated from or include one or more layers of neutron and/or gamma radiation absorbing materials. In embodiments, the at least one internal baffle 142 may extend continuously from the external perimeter of the core barrel 122 to the internal surface of the intermediate high-pressure shell portion 140. In embodiments, one or more expansion joints or similar structures may be incorporated into the design and construction of the at least one internal baffle 142 to accommodate the thermal expansion and contraction of either or both the reactor core assembly 120 and/or the steam generator assembly 180.

In some embodiments, the at least one internal baffle 142 may include a multi-piece baffle in which a first annular portion of the at least one internal baffle 142 physically couples to the internal surface of the intermediate high-pressure shell portion 140 and a second annular portion of the at least one internal baffle 142 physically couples to the core barrel 122 and the external perimeter of the second annular portion overlaps, but does not contact the external perimeter of the first annular portion. In other embodiments, the at least one internal baffle 142 may include an annular member having an outer perimeter that physically couples to the internal surface of the intermediate high-pressure shell portion 140 and an inner perimeter that is disposed proximate, but does not physically couple to the external surface of the core barrel 122. In yet other embodiments, the at least one internal baffle 142 may include an annular member having an inner perimeter that physically couples to the external surface of the core barrel 122 and an outer perimeter that is disposed proximate, but does not physically couple to the internal surface of the intermediate high-pressure shell portion 140.

The intermediate high-pressure shell portion 140 includes a generally cylindrical member having a first end 144 disposed proximate the first high-pressure shell portion 110 and a second end 146 opposite the first end 144 disposed proximate the second high-pressure shell portion 170. A physical coupling device 134 may be used to detachably attach the intermediate high-pressure shell portion 140 to the first high-pressure shell portion 110. In at least some embodiments, the physical coupling device 134 may include a first flange member physically coupled proximate the first end 144 of the intermediate high-pressure shell portion 140 and a second flange member physically coupled proximate the first end 112 of the first high-pressure shell portion 110. Removable fasteners, such as all-thread and nuts or bolts and nuts may be used to detachably attach the intermediate high-pressure shell portion 140 to the first high-pressure shell portion 110.

A physical coupling device 194 may be used to detachably attach the intermediate high-pressure shell portion 140 to the second high-pressure shell portion 170. In at least some embodiments, the physical coupling device 194 may include a first flange member physically coupled proximate the second end 146 of the intermediate high-pressure shell portion 140 and a second flange member physically coupled proximate a first end 172 of the second high-pressure shell portion 170. Removable fasteners, such as all-thread and nuts or bolts and nuts may be used to detachably attach the intermediate high-pressure shell portion 140 to the second high-pressure shell portion 170.

The intermediate high-pressure shell portion 140 may operate at any temperature and pressure. In embodiments, the intermediate high-pressure shell portion 140 may operate at a pressure of about: 150 pounds per square inch (psi) or less; 300 psi or less; 600 psi or less; 900 psi or less; 1500 psi or less; or 3000 psi or less. In embodiments, the intermediate high-pressure shell portion 140 may operate at a temperature of about: 500° F. or less; 750° F. or less; 1000° F. or less; 1500° F. or less; 2000° F. or less; or 2500° F. or less. In some embodiments, all or a portion of the internal surface of the intermediate high-pressure shell portion 140 may be lined with one or more neutron and/or gamma radiation absorbing materials. The intermediate high-pressure shell portion 140 may be fabricated from one or more materials capable of withstanding the expected operating temperature and pressure while maintaining structural integrity and providing an adequate margin of safety.

The intermediate high-pressure shell portion 140 may include one or more connectors, couplings, or connection points for the operable coupling of one or more coolant gas circulators 150 to draw the relatively cool coolant gas 152 at the first temperature from the space in the second high-pressure shell portion 170 surrounding the thermal transfer assembly 180 and push the coolant gas 152 at the first temperature into the space in the first high-pressure shell portion 110 surrounding the reactor core assembly 120.

The thermal transfer assembly 180 is disposed at least partially within the second high-pressure shell portion 170. The second high-pressure shell portion 170 is a hollow, generally cylindrical member that includes a first end 172 disposed proximate the second end 146 of the intermediate high-pressure shell portion 140 and a second end 174 opposite the first end 172. A head 190 or similar sealing device couples to the second end 174 of the second high-pressure shell portion 170.

In embodiments, the thermal transfer assembly 180 may include one or more steam generators, each having one or more fluid conduits 184 to accommodate the passage of boiler feedwater used to produce superheated steam 186. In some embodiments, the steam generator assembly 180 may include a plurality of fluid conduits 184A-184n arranged horizontally, vertically, or any combination thereof. In at least some embodiments, the fluid conduit 184 may include a helical coil disposed about at least a portion of the external surface of the flow separation barrel 182.

In embodiments, the flow separation barrel 182 may be disposed about all or a portion of the thermal transfer assembly 180. The flow separation barrel 182 may include a number of sections. A first section of the flow separation barrel 182 may include a first, relatively large diameter, hollow, cylindrical portion 182A. In some embodiments, the thermal transfer assembly 180 may be disposed at least partially within the first, relatively large diameter, hollow, cylindrical portion 182A. In other embodiments, the thermal transfer assembly 180 may include a helical fluid conduit 184 disposed about at least a portion of the external surface of the first, relatively large diameter, hollow, cylindrical portion 182A.

A second section of the flow separation barrel 182 may include a hollow tapered, or frustoconical, portion 182B that reduces the diameter of the flow separation barrel 182 from the first, relatively large diameter to a second, relatively smaller, diameter. A third section of the flow separation barrel 182 may include a second, relatively smaller diameter, hollow, cylindrical portion 182C that extends at least partially into the intermediate high-pressure shell portion 140 and accommodates the insertion of at least a portion of the second cylindrical portion 122C of the core barrel 122. In embodiments, the volume of the thermal transfer assembly 180 may be increased by increasing the diameter of the flow separation barrel 182. Alternatively, the physical length of the MIGHTR 100 may be reduced by increasing the diameter of the flow separation barrel 182. In embodiments that include a helical fluid conduit 184, the helical fluid conduit 184 may include an appropriately designed primary heat exchanger inlet, primary heat exchanger outlet, inner Hastelloy X support and helical rout. In such embodiments, azimuthal Support of the inner Hastelloy components may be provided on axially guided fingers inside rails on stainless steel slots.

The first, relatively large diameter, hollow, cylindrical portion 182A may have any diameter. In embodiments, the first, relatively large diameter, hollow, cylindrical portion 182A may have a diameter of about: 3 feet or greater; 5 feet or greater; 10 feet or greater; 15 feet or greater; 20 feet or greater; 25 feet or greater; 30 feet or greater; or 35 feet or greater. In embodiments, the second, relatively smaller diameter, hollow, cylindrical portion 182C may have a diameter of about: 3 foot or greater; 5 feet or greater; 7 feet or greater; 10 feet or greater; 15 feet or greater; or 20 feet or greater. The frustoconical portion 182B has a base diameter equal to the diameter of the first cylindrical portion 182A, an apex diameter equal to the diameter of the second cylindrical portion 182C, and any height. In embodiments, the frustoconical portion 182B may have a height of about: 1 foot or greater; 2 feet or greater, 5 feet or greater, 10 feet or greater; or 15 feet or greater.

In embodiments, the one or more fluid conduits 184 may include one or more vertical fluid conduits, one or more horizontal fluid conduits, one or more helical fluid conduits, or any combination thereof. In at least some embodiments, the one or more fluid conduits 184 may be disposed proximate at least a portion of the internal or the external surface of the first cylindrical portion 182A of the flow separation barrel 182. The thermal transfer fluid flowing through the one or more fluid conduits 184 is heated by the relatively warm coolant gas 154 exiting the reactor core assembly 120 at the second temperature. The coolant gas 154 flows through the second cylindrical portion 182C, the frustoconical portion 182B, and finally the first cylindrical portion 182A of the flow separation barrel 182. As the coolant gas 154 passes through the flow separation barrel 182, the temperature of the coolant gas is reduced such that the coolant gas exits the flow separation barrel 182 as a coolant gas 152 at a first temperature that is lower than the second temperature.

The one or more fluid conduits 184 may include one or more helical fluid conduits, each having any number of turns and any pitch. The one or more fluid conduits 184 may include any number of independent circuits disposed proximate the internal surface or the external surface of the first cylindrical portion 182A of the flow separation barrel 182. For example, the one or more fluid conduits 184 may include two or more independent circuits (i.e., circuits that share a common feed and/or common steam outlet, but are otherwise independent with no crossover occurring in the second high-pressure shell portion 170). The one or more fluid conduits 184 may have any diameter. For example, in embodiments, each of the fluid conduits included in the one or more fluid conduits 184 may have a diameter of about: 1½ inches or less; 2 inches or less; 2½ inches or less; 3 inches or less; 4 inches or less; or 6 inches or less. In at least some embodiments, the thermal transfer assembly 180 may provide a thermal transfer fluid or gas at an elevated temperature and at any pressure. In other embodiments, the thermal transfer assembly 180 may generate superheated steam at any temperature or pressure.

In embodiments, the longitudinal axis 104 of the second high-pressure shell portion 170 may be aligned (i.e., collinear) with the longitudinal axis 102 of the first high-pressure shell portion 110. In other embodiments, the longitudinal axis 104 of the second high-pressure shell portion 170 may be skew to the longitudinal axis 102 of the first high-pressure shell portion 110. For example, the longitudinal axis 104 of the second high-pressure shell portion 170 may be inclined by about 1° or less; about 2° or less; or about 5° or less with respect to the longitudinal axis 102 of the first high-pressure shell portion 110.

In embodiments, the second high-pressure shell portion 170 may be sealed or enclosed using a head 190 or similar sealing device. A physical coupling device 192 may be used to detachably attach the head 190 to the second high-pressure shell portion 170. In at least some embodiments, the physical coupling device 192 may include a first flange member physically coupled proximate the second end 174 of the second high-pressure shell portion 170 and a second flange member physically coupled to the head 190. Removable fasteners, such as all-thread and nuts or bolts and nuts may be used to detachably attach the head 190 to the second high-pressure shell portion 170.

A physical coupling device 194 may physically couple the first end 172 of the second high-pressure shell portion 170 to the second end of the intermediate high-pressure shell portion 140. In at least some embodiments, the physical coupling device 194 may include a first flange member physically coupled proximate the first end 172 of the second high-pressure shell portion 170 and a second flange member physically coupled proximate a second end 146 of the intermediate high-pressure shell portion 140. Removable fasteners, such as all-thread and nuts or bolts and nuts may be used to detachably attach the second high-pressure shell portion 170 to the intermediate high-pressure shell portion 140.

The second high-pressure shell portion 170 may operate at any temperature and pressure. In embodiments, the second high-pressure shell portion 170 may operate at a pressure of about: 150 pounds per square inch (psi) or less; 300 psi or less; 600 psi or less; 900 psi or less; 1500 psi or less; or 3000 psi or less. In embodiments, the second high-pressure shell portion 170 may operate at a temperature of about: 500° F. or less; 750° F. or less; 1000° F. or less; 1500° F. or less; 2000° F. or less; or 2500° F. or less. In some embodiments, all or a portion of the internal surface of the second high-pressure shell portion 170 may be lined with one or more neutron and/or gamma radiation absorbing materials. The second high-pressure shell portion 170 may be fabricated from one or more materials capable of withstanding the expected operating temperature and pressure while maintaining structural integrity and providing an adequate margin of safety.

Figure 2:
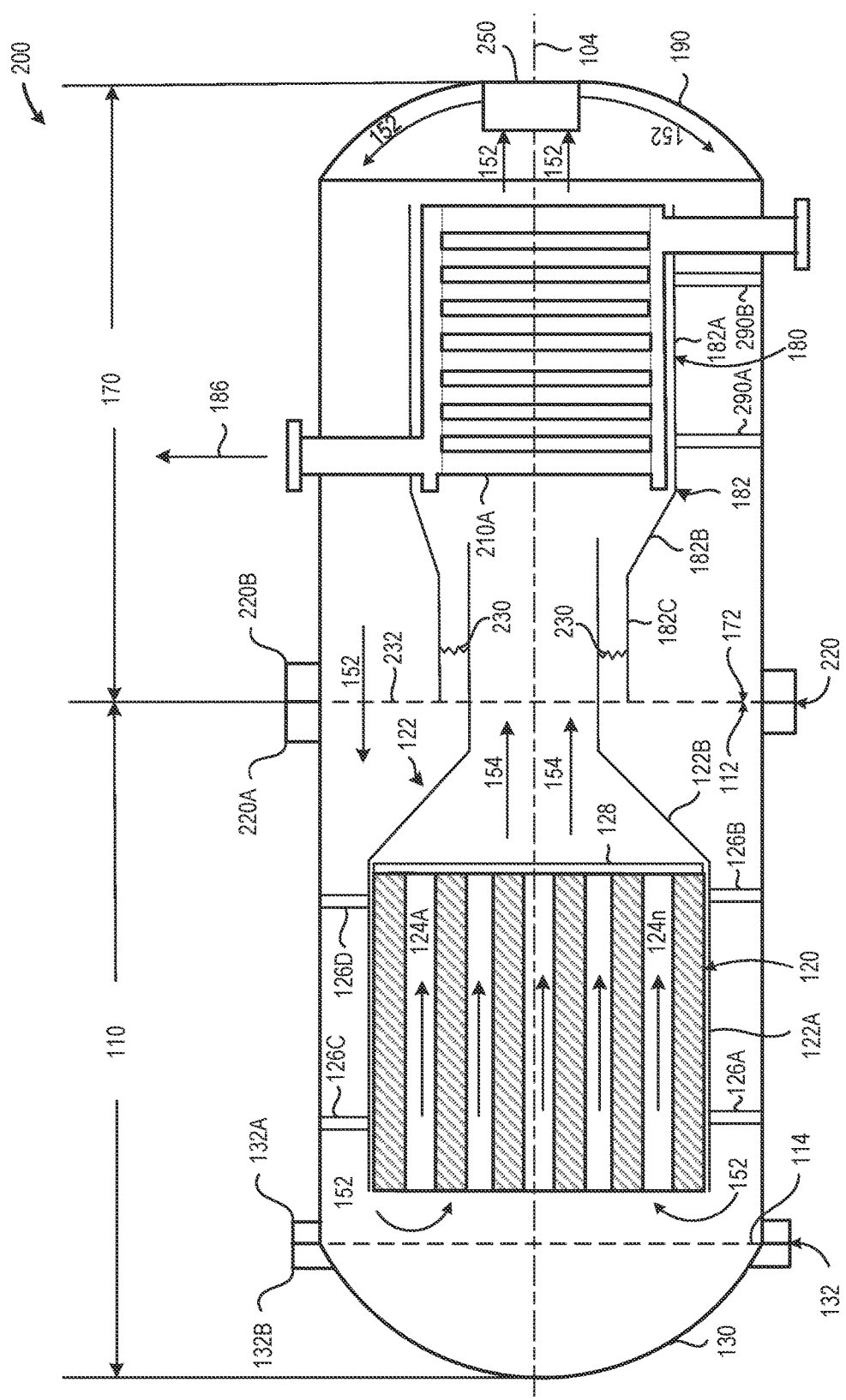
FIG. 2 is a cross-sectional elevation depicting another illustrative Modular Integrated Gas High Temperature Reactor (MIGHTR) having a thermal transfer assembly that includes a plurality of vertical tubes across, about, and around which the relatively warm coolant gas exiting the reactor core assembly passes, in accordance with at least one embodiment described herein.

FIG. 2 is a cross-sectional elevation depicting another illustrative Modular Integrated Gas High Temperature Reactor (MIGHTR) 200 having a thermal transfer assembly 180 that includes a plurality of vertical tubes 210A-210n across, about, and around which the relatively warm coolant gas 154 exiting the reactor core assembly 120 passes, in accordance with at least one embodiment described herein. As depicted in FIG. 2, in some embodiments, the high-pressure shell may include only the first high-pressure shell portion 110 and a second high-pressure shell portion 170 physically coupled together using one or more physical coupling devices 220, such as a flange connection. In addition, as depicted in FIG. 2, the MIGHTR 200 may include one or more coolant gas circulators 250 disposed at least partially within the second high-pressure shell portion 170 and or a head 190 coupled to the second high-pressure shell portion 170. In embodiments, a first physical coupling device 220A, such as a flange member, may be affixed to the first end 112 of the first high-pressure shell portion 110 and a second physical coupling device 220B, such as a complimentary flange member, may be affixed to the first end 172 of the second high-pressure shell portion 170.

Similar to the MIGHTR 100 depicted in FIG. 1, the cylindrical second portion 122C of the core barrel 122 of MIGHTR 200 depicted in FIG. 2 extends into the cylindrical second portion 182C of the flow separation barrel 182. In embodiments, one or more sealing devices 230 may be physically affixed to at least one of: the external surface of the cylindrical second portion 122C of the core barrel 122 and/or the internal surface of the cylindrical second portion 182C of the flow separation barrel 182 to provide a seal that retains the relatively warm coolant gas 154 inside the core barrel 122 and the flow separation barrel 182 and the relatively cool coolant gas 152 on the outside of the core barrel 122 and the flow separation barrel 182. The one or more sealing devices 230 may include a flexible member, such as a bellows, to accommodate the thermal expansion/contraction of the core barrel 122 and/or the flow separation barrel 182. As depicted in FIG. 2, the coolant gas circulator 250 may cause the relatively cool coolant gas 152 exiting the flow separation barrel 182 to return back to the inlet of the cylindrical first portion 122A of the core barrel 122 that surrounds the reactor core assembly 120. In embodiments, the coolant gas circulator 250 disposed in the second high-pressure shell portion 170 may function as a primary coolant gas circulator and a plurality of coolant gas circulators 150A-150n disposed in another location at least partially within the high-pressure shell (e.g., such as at least partially within the intermediate high-pressure shell portion as depicted in FIG. 1), may provide back-up coolant circulation capability, for example in the event of failure of the coolant gas circulator 250.

Also, as depicted in FIG. 2, a physical connector 192 couples the head 190 in which the coolant gas circulator 250 is disposed to the second high-pressure shell portion 170. In embodiments, the physical connector 192 may include a first flange member 192A physically affixed to the second end 174 of the second high-pressure shell portion 170 and a complimentary second flange member 192B physically affixed to the head 190. In such embodiments, separating the head 190 from the second high-pressure shell portion 170 permits access to the coolant gas circulator 250 and to the thermal transfer assembly 180.

Figure 3:
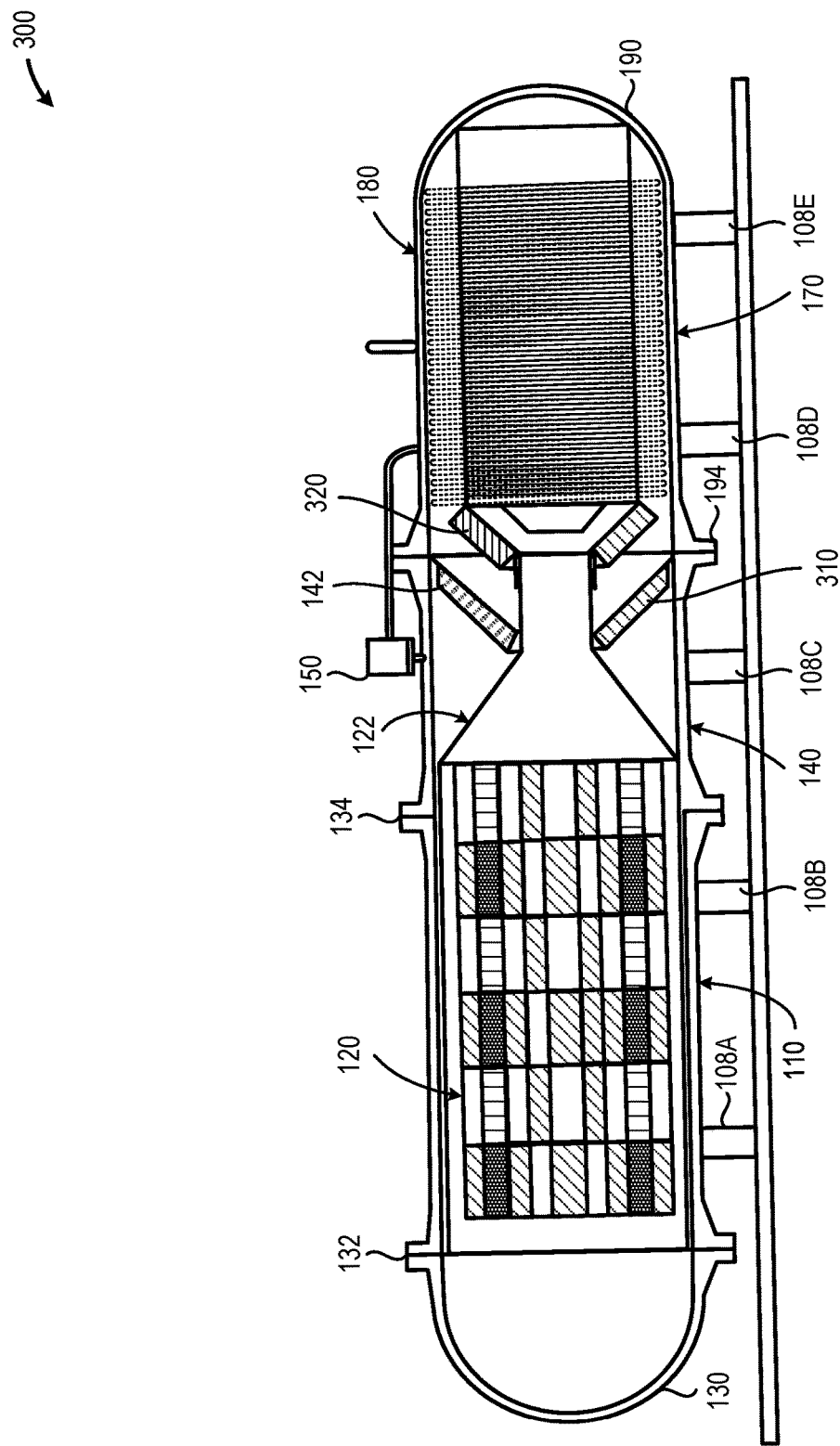
FIG. 3 is a cross-sectional elevation depicting another illustrative Modular Integrated Gas High Temperature Reactor (MIGHTR) having a different internal baffle design that includes a layer of neutron and/or gamma radiation absorbing material and in which the frustoconical portion of the flow separation barrel also includes a layer of neutron and/or gamma radiation absorbing material, in accordance with at least one embodiment described herein.

FIG. 3 is a cross-sectional elevation depicting another illustrative Modular Integrated Gas High Temperature Reactor (MIGHTR) 300 having a different internal baffle 142 design that includes a layer of neutron and/or gamma radiation absorbing material 310 and in which the frustoconical portion 182B of the flow separation barrel 182 also includes a layer of neutron and/or gamma radiation absorbing material 320, in accordance with at least one embodiment described herein. As depicted in FIG. 3, in some embodiments the internal baffle 142 may extend at an angle other than 90° from the second cylindrical portion 122C of the core barrel 122. For example, in some embodiments, the internal baffle 142 may extend from the external surface of the second cylindrical portion 122C of the core barrel 122 at an angle of: about 22.5° to about 90°; about 30° to about 75°; or about 30° to about 60°.

As depicted in FIG. 3, in some embodiments, one or more neutron and/or gamma radiation shielding materials may be disposed in, on, about, or across at least a portion of the internal baffle 142. Similarly, in some embodiments, one or more neutron and/or gamma radiation shielding materials may be disposed in, on, about, or across at least a portion of the frustoconical portion 182B of the flow separation barrel 182. Example shielding materials include but are not limited to: ordinary concrete; heavy concrete containing heavy natural aggregates (e.g., barites) or manufactured aggregates such as iron, steel balls, steel punch and similar.

Figure 4:
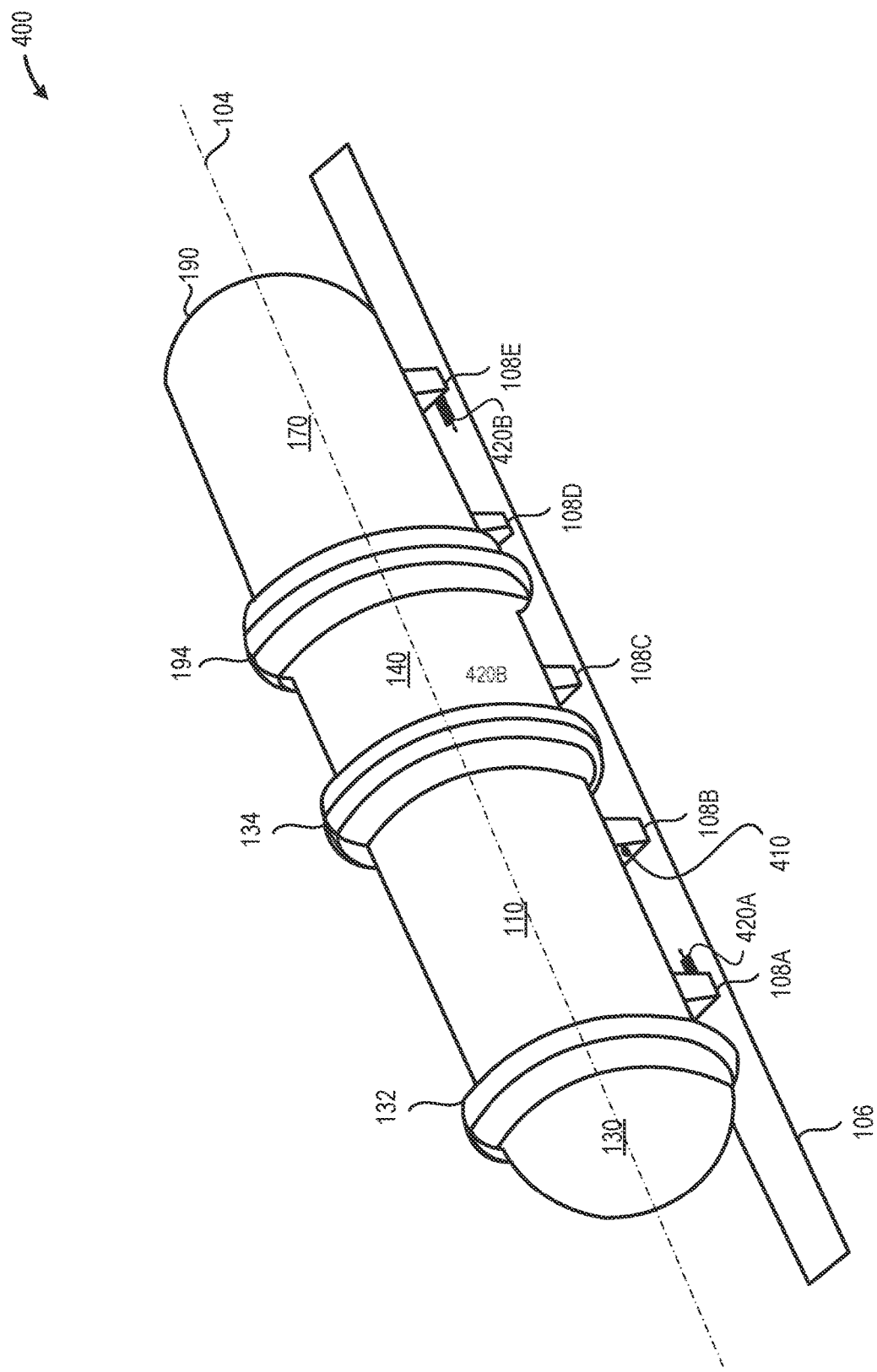
FIG. 4 is a perspective view of the illustrative Modular Integrated Gas High Temperature Reactor (MIGHTR) depicted in FIG. 3 depicting the external configuration of the head, the first high-pressure shell portion, the intermediate high-pressure shell portion, and the second high-pressure shell portion, in accordance with at least one embodiment described herein.

FIG. 4 is a perspective view of the illustrative Modular Integrated Gas High Temperature Reactor (MIGHTR) depicted in FIG. 3 depicting the external configuration of the head 130, the first high-pressure shell portion 110, the intermediate high-pressure shell portion 140, and the second high-pressure shell portion 170, in accordance with at least one embodiment described herein. Also visible in FIG. 3 is the flange connection 132 that physically couples the head 130 to the first high-pressure shell portion 110, the flange connection 134 that physically couples the first high-pressure shell portion 110 to the intermediate high-pressure shell portion 140, and the flange connection 194 that physically couples the intermediate high-pressure shell portion 140 to the second high-pressure shell portion 170.

As depicted in FIG. 4, a plurality of support elements 108A-108E (collectively, "support elements 108"), such as rollers, slide plates, or similar elements permitting the axial displacement of the first high-pressure shell portion 110 along the guide rail 106 in the surface beneath the MIGHTR may be evenly or unevenly disposed on the lower surface, at the horizontal midplane, or anywhere in between of the MIGHTR. In embodiments, the support elements 108 permit the linear displacement of the high-pressure shell of the MIGHTR 100 along the underlying support surface and/or one or more guide rails 106 disposed in, on, or about the support surface beneath all or a portion of the first high-pressure shell portion 110, the intermediate high-pressure shell portion 140, and/or the second high-pressure shell portion 170. Thus, in operation, the support elements 108 permit the thermal expansion and contraction of the high-pressure shell along the longitudinal axis 104 of the high-pressure shell. For maintenance, service, refueling, assembly or inspection, the rollers 108 permit the displacement of the first high-pressure shell portion 110 to access the reactor core assembly 120 and/or the second high-pressure shell portion 170 to access the thermal transfer assembly 180. In at least some embodiments, each of the support elements 108 may be permanently (e.g., via welding) or detachably (e.g., via threaded fasteners) attached to one or more locations on the outer cylindrical wall of the first high-pressure shell portion 110, the intermediate high-pressure shell portion 140, and/or the second high-pressure shell portion 170.

In embodiments, one or more axial stop elements 410 may be used to axially affix or otherwise stop at least one of: the first high-pressure shell portion 110 and/or the second high-pressure shell portion 170 to an axially fixed point on a support structure. The one or more axial stop elements 410 permit the one or more support elements 108 permit the thermal expansion and/or contraction of the first high-pressure shell portion 110, the intermediate high-pressure shell portion 140, and/or the second high-pressure shell portion 170 along the support structure or guide rails 106. The one or more stop elements 410 may include but are not limited to: one or more shear keys or one or more tie rod anchor elements.

In embodiments one or more tensioner connection features 420A, 420B may be operably coupled to at least one of: the first high-pressure shell portion 110 or the second high-pressure shell portion 170. In such embodiments, the one or more tensioner connection features 420A, 420B may include but are not limited to: one or more shear keys or one or more lugs to permit coupling one or more tensioners affixed to the support structure to at least one of: the first high-pressure shell portion or the second high-pressure shell portion. The tensioner connection features 420A, 420B may be disposed at any location on the high-pressure shell to perform the axial stop function. For example, the tensioner connection features 420A, 420B may be disposed in, on, or about the upper part of at least one of: the first high-pressure shell portion 110, the intermediate high-pressure shell portion 140, and/or the second high-pressure shell portion 170, at the mid-horizontal plane of at least one of: the first high-pressure shell portion 110, the intermediate high-pressure shell portion 140, and/or the second high-pressure shell portion 170, etc. The one or more tensioners to relieve at least a portion of the stress caused by the thermal expansion and/or contraction of either or some or all the first high-pressure shell portion 110 and/or the second high-pressure shell portion 170 and/or the flow separation barrel 182 and/or the core barrel 122.

Figure 5:
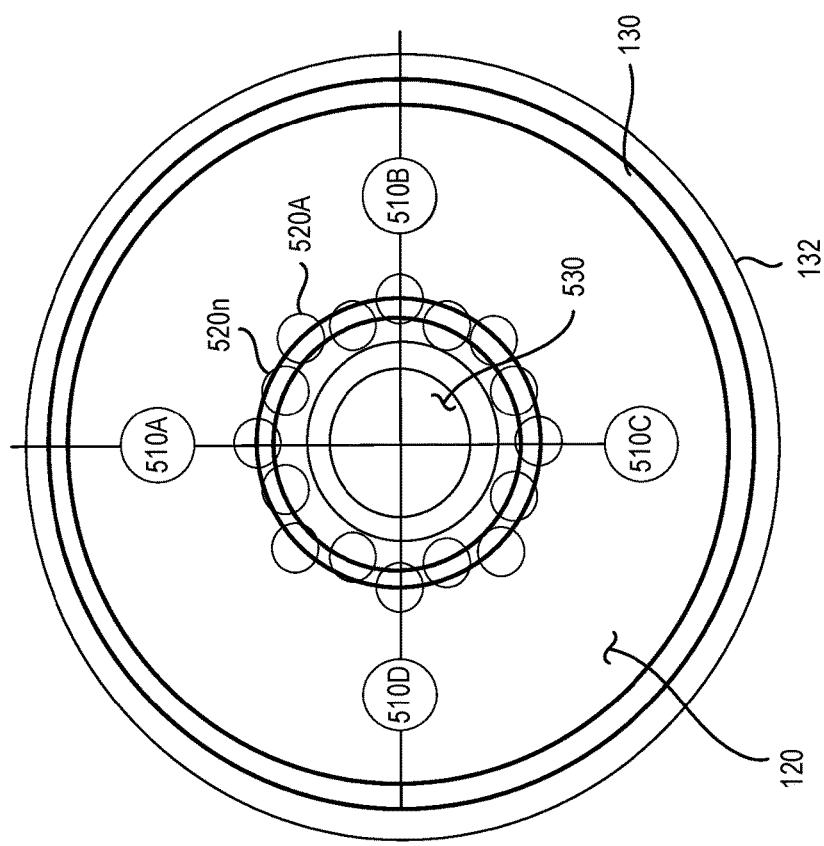
FIG. 5 is a cross sectional elevation that depicts the internal arrangement of an illustrative reactor core assembly that includes a reactor core assembly cover, a plurality of fuel transfer channels, a plurality of control rod channels, and an in-vessel fuel handling machine (IVFHM), in accordance with at least one embodiment described herein.

FIG. 5 is a cross sectional elevation that depicts the internal arrangement of an illustrative reactor core assembly 120 that includes a reactor core assembly cover, a plurality of fuel transfer channels 510A-510n (four depicted in FIG. 5, collectively, "fuel transfer channels 510"), a plurality of control rod channels 520A-520n (collectively, "control rod channels 520"), and an in-vessel fuel handling machine (IVFHM) 530, in accordance with at least one embodiment described herein. In embodiments, a spacer grid separates maintains the spacing between the fuel rod assemblies and the control rod assemblies. In embodiments, the spacer grid may include a plurality of rods and springs and may be supported at the reactor core assembly cover. Increasing the length of the reactor core assembly cover may guide the spacer grid on the reactor core assembly cover, and may additionally provide a guide for the IVFHM 530. In embodiments, the spacer grid may by fabricated such that a central portion of the spacer grid remains removeable to leave way for the IVFHM 530. The increased length of the cover can be used as support for the control rod equipment.

In embodiments, the fuel handling system may include but is not limited to a fuel handling machine, one or more fuel transfer casks, a fuel handling equipment positioner, a fuel handling equipment support structure, a cask handling robot, and local used fuel storage and handling facilities. In embodiments, the fuel handling equipment support structure and fuel may be common with the out-vessel control rod support structure. If the same support structure is shared by control rod and fuel handling equipment, the fuel handling positioner may be simplified. In embodiments, each fuel and reflector element can be uniquely identifiable to support any accountability requirements. A fuel sealing and inspection facility may be included in the system to provide for receipt and inspection of new fuel, and for packaging of used fuel for transport to storage or disposition either within either an in-plant storage area or an off-site disposal or recovery area. Refueling generally takes place on a specific schedule and involves replacing or replenishing the entire fuel element inventory in the reactor core assembly 120, plus certain replaceable reflector elements. Almost the entire reactor core assembly 120 may be unloaded after each cycle and reloaded using fresh fuel. In embodiments, the fuel rod assemblies may be removed and then individually replaced on a one-by-one basis.

In embodiments, the IVFHM 530 includes a long cask that may be flanged at the IVFHM flange on the head 130. In embodiments, the IVFHM 530 may include a rigid structure, such as a beam, a telescopic arm, or a truss structure. In embodiments, the rigid structure can be up to about 66 feet (20 meters) in length. An articulatable rotating arm may be disposed proximate the distal end of the rigid member. The articulable rotating arm may have sufficient length to reach the fuel rod assemblies and/or fuel rod dummies in the reactor core assembly 120 proximate the perimeter of the core barrel 122. In embodiments, the tip the articulable rotating arm may include a 3rd articulation and a mechanism downstream from it for handling fuel rod assemblies. The IVFHM 530 may have up to 4 degrees of freedom: extension of the articulatable rotating arm, and yaw rotation about the axis of the articulatable rotating arm, pitch rotation of a 2nd arm segment or portion, and another pitch rotation of the 3rd arm segment or portion. The arm transits on the cask outside the first high-pressure shell portion 110 and/or the head 130. A portion of the arm may remain outside of the head 130 to counter the bending moment. The cask containing the IVFHM 530 may either remain connected to the head 130 during operation, or the opening for the IVFHM 530 may be plugged or blinded.

In embodiments, an in-core neutron flux mapping unit may be connected to the flange used to connect the IVFHM 530. In such embodiments, the in-core neutron flux mapping unit may be periodically replaced, for example while refueling the reactor core assembly 120. The IVFHM 530 enters the reactor core assembly 120, for example by passing through the opening in the spacer grid, retrieving a fuel rod assembly each time the IVFHM 530 passes through the reactor core assembly 120. In embodiments, once in head 130, outside the core barrel 122, the fuel rod assemblies may be placed in one of the plurality of fuel transfer channels 510. The reactor core assembly 120 may be reloaded by reversing the process.

In embodiments, each of the plurality of fuel transfer channels 510 receive the fuel rod assemblies and fuel rod dummies from the IVFHM 530 and transfers the fuel rod assemblies and/or fuel rod dummies outside, directly to a cask. Such as a helium cooled cask. These casks may then be retrieved by a cask handling robot and placed in the local fuel storage, from where is transported to the fuel storage outside the reactor building.

Figure 6:
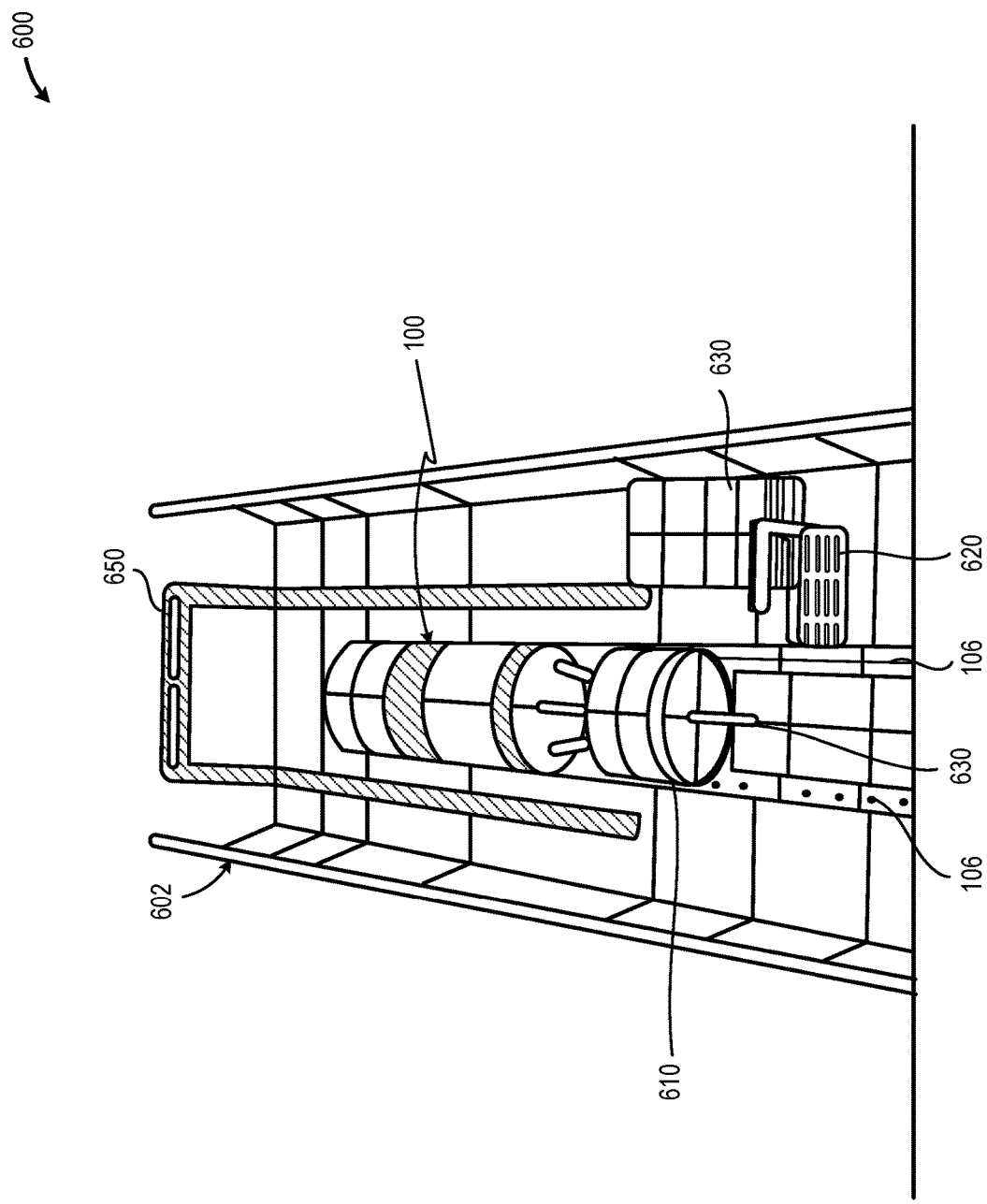
FIG. 6 is a top perspective view of an illustrative fuel handling system that also depicts an illustrative reactor hall that includes the fuel handling equipment, in accordance with at least one embodiment described herein.

FIG. 6 is a top perspective view of an illustrative fuel handling system 600 that also depicts an illustrative reactor hall 602 that includes the fuel handling equipment, in accordance with at least one embodiment described herein. A service module 610 supports the IVFHM 530 and fuel transfer channel 510. A local fuel storage transfer robot 620 may be positioned proximate the guide rails 106 on the floor of the reactor hall 602. In embodiments, the local fuel storage transfer robot 620 retrieves casks from the reactor core and transfers the casks to a local fuel storage system 630 positioned proximate the local fuel storage transfer robot 620. In embodiments, a cask transfer robot 620 may use a support superstructure 650 to transfer or otherwise transport casks to one or more fuel storage wells. In some implementations, one or more separate transfer channels may be used to transfer casks to the one or more fuel storage wells. In embodiments, the control rod mechanism for the reactor core assembly 120 may be disposed inside the head 130. In such embodiments, the control rod mechanism may be coupled to a normally closed electromagnetic activation mechanism in which power keeps the control rod mechanism open during operation while providing a failsafe in the event of a power interruption or failure. In embodiments, one or more tensioners or compression elements, such as one or more springs, may be operably coupled to the guide rails supporting at least one of the first high-pressure shell portion 110, the intermediate high-pressure shell portion 140, and/or the second high-pressure shell portion 170, thereby relieving the stress that axial movement (e.g., caused by thermal expansion of the high-pressure shell) places on the physical connectors (e.g., the flange bolts) that tie the shell portions together. In other embodiments, a slight inclination of the guide rails 106 may be used to impede water from going to the reactor core assembly 120. In embodiments, a first portion of the guide rails positioned beneath the first high-pressure shell portion 110 and a second portion of the guide rails positioned beneath the second high-pressure shell portion 170 may be inclined with respect to each other. Such inclined guide rails 106 may also assist in causing the fuel rod assemblies to preferentially "slide" to open the end of the reactor core assembly 120 (i.e., the end of the reactor core assembly 120 first removed from the first high-pressure shell portion 110) rather than sliding toward the portion of the first high-pressure shell portion 110 facing the intermediate high-pressure shell portion 140, improving the safety of the refueling process, and to make FAs fall to the back end of the core, making the refueling process safer.

The support superstructure 650 may be linearly displaceable along one or more rails. In addition, the support super structure 650 may include one or more robotic arms useful for performing different assembly/disassembly operations associated with servicing and/or maintaining the MIGHTR 100. In embodiments, the support superstructure 650 may include a plurality of superstructures, for example a first superstructure disposed on the left side of the MIGHTR 100 and a second superstructure disposed on the left side of the MIGHTR 100. In some embodiments, the control rod mechanism and the head 130 may be disposed proximate a wall, for operation and maintenance of the MIGHTR 100 from an alternative location. In embodiments, the guide rails 106 may include base isolation to resist movement of the MIGHTR 100 with respect to the support surface beneath the MIGHTR 100, for example, as a result of impact or a seismic event. In embodiments, the building or structure surrounding the MIGHTR 100 may be contained using a liner on the flat walls, or an internal radiation barrier. The use of such containment devices or systems may beneficially enable human access during refueling or servicing. In other embodiments cylindrical steel/rad-ins containment around the primary system may be used to beneficially enable human access during refueling or servicing. In embodiments, a steel containment vessel may be used inside the building to protect personnel and equipment within the building from steam production. In embodiments, the line and the repair devices around the MIGHTR 100 may be disposed in a sequential arrangement to perform sequential service, maintenance, or refueling tasks. In some embodiments, a structure may be disposed between the lower portion of the first high-pressure shell portion 110 and the rails 106 to capture the reactor core assembly 120 in case of a meltdown, thereby protecting the floor beneath the MIGHTR 100 and the rails 106.

Figure 7A:
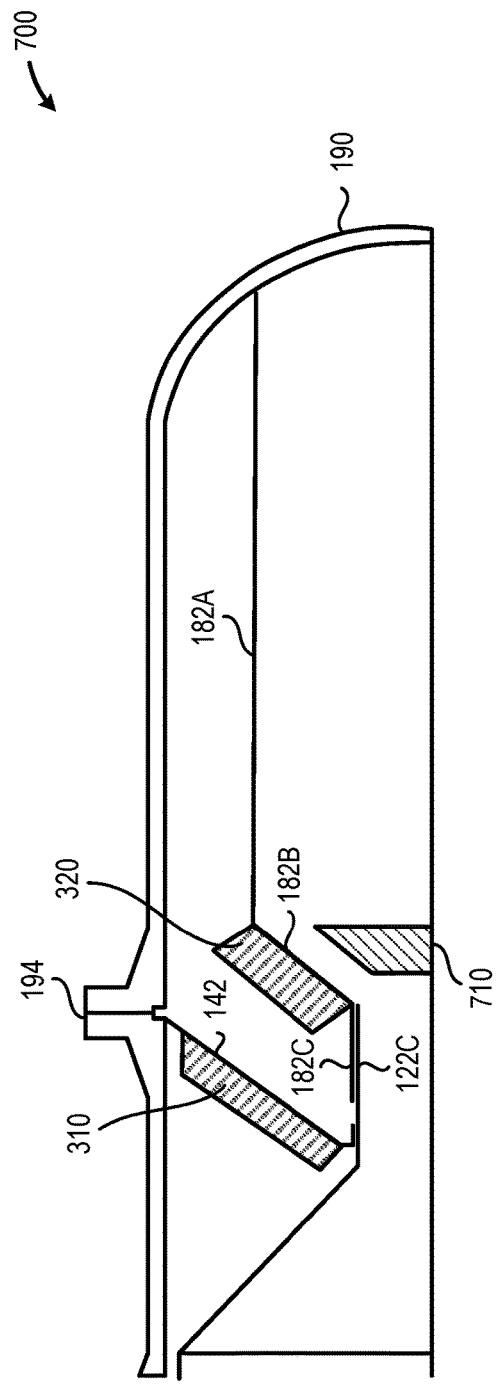
FIG. 7A is a partial cross-sectional elevation of the second high-pressure shell portion and a portion of the intermediate high-pressure shell portion that depicts the physical relationship between the second cylindrical portion of the core barrel, the internal baffle, and the second cylindrical portion of the flow separation barrel, in accordance with at least one embodiment described herein.
Figure 7B:
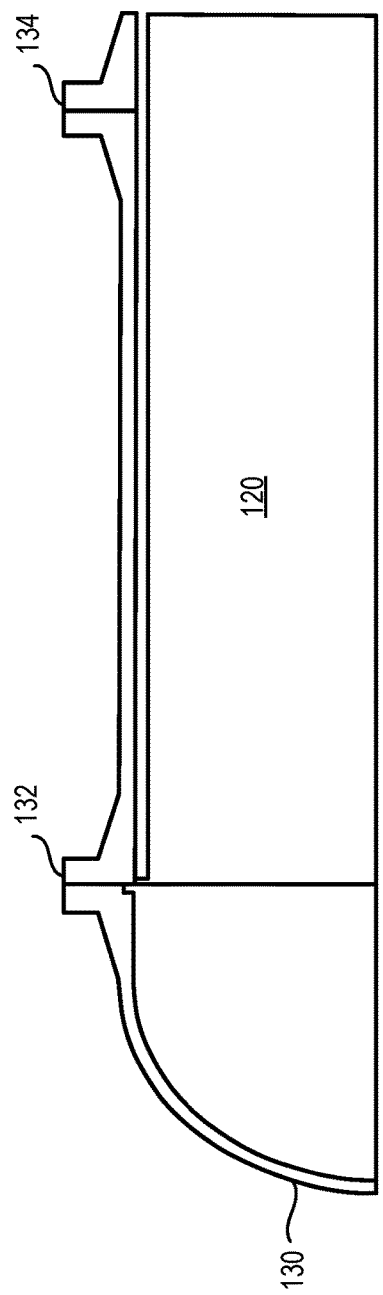
FIG. 7B is a partial cross-sectional elevation of the first high-pressure shell portion including the head, physical connector disposed on the second end of the first high-pressure shell portion and the physical connector disposed on the first end of the first high-pressure shell portion, in accordance with at least one embodiment described herein.

FIG. 7A is a partial cross-sectional elevation of the second high-pressure shell portion 170 and a portion of the intermediate high-pressure shell portion 140 that depicts the physical relationship between the second cylindrical portion 122C of the core barrel 122, the internal baffle 142, and the second cylindrical portion of 182C of the flow separation barrel 182, in accordance with at least one embodiment described herein. FIG. 7B is a partial cross-sectional elevation of the first high-pressure shell portion 110 including the head 130, physical connector 132 disposed on the second end 114 of the first high-pressure shell portion 110 and the physical connector 134 disposed on the first end 112 of the first high-pressure shell portion 110, in accordance with at least one embodiment described herein.

Referring first to FIG. 7A, the second cylindrical portion 122C of the core barrel 122 is inserted at least partially into and disposed a short distance from the second cylindrical portion 182C of the flow separation barrel 182. As depicted in FIG. 7A, the spacing between the second cylindrical portion 122C and the second cylindrical portion 182C permits the thermal expansion and/or contraction of the barrel 122 and the flow separation barrel 182. Also as depicted in FIG. 7A, in embodiments, a first end of the internal baffle 142 may be physically coupled to the internal surface of the intermediate high-pressure shell portion 140 and a second end of the internal baffle 142 may be disposed a short distance from the second cylindrical portion 122C of the core barrel 122. As depicted in FIG. 7A, a radiation shield 710 may be disposed inside the flow separation barrel 182, proximate the discharge point of the second cylindrical portion 122C. In embodiments, although not depicted in FIG. 7A, a bellows type connection 230 may be disposed between the second cylindrical portion 122C and the second cylindrical portion 182C.

As depicted in FIG. 7A, in embodiments a neutron and/or gamma radiation absorbing material 210 may be disposed in, on, about, or across at least a portion of the surface of the internal baffle 142 facing the reactor core assembly 120. Additionally, neutron and/or gamma radiation absorbing material 220 may be disposed in, on, about, or across at least a portion of the surface of the frustoconical portion 182B facing the reactor core assembly 120. In embodiments, the radiation shield 710 may also include neutron and/or gamma radiation absorbing material. In embodiments, the neutron and/or gamma radiation absorbing material may be a plurality of materials suitable for the capture of neutrons and gamma radiation. For example, in some embodiments, the neutron and/or gamma radiation absorbing material may include one or more layers containing boron carbide for neutron capture and one or more layers containing Inconel for gamma radiation mitigation.

Figure 8:
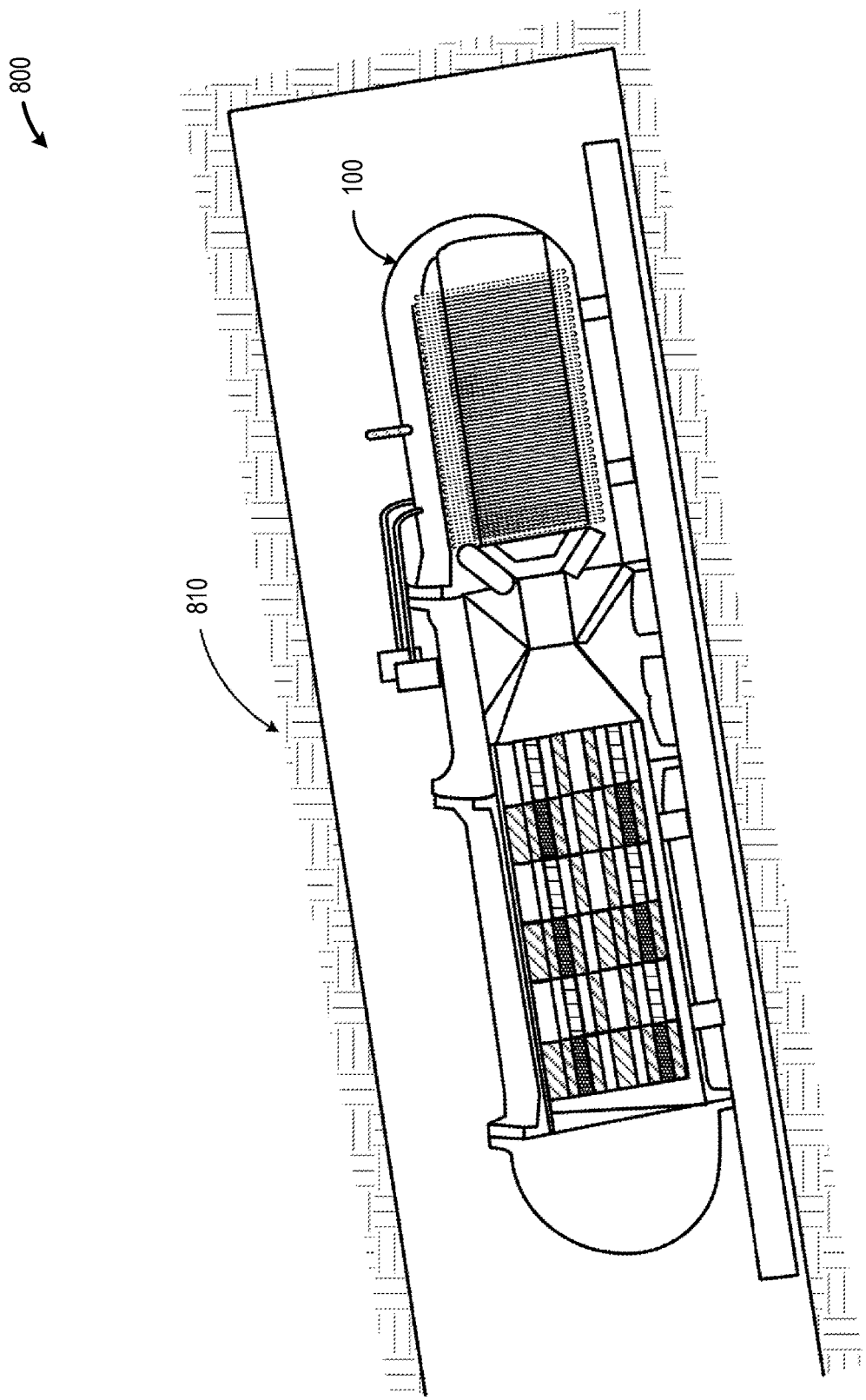
FIG. 8 is an elevation view of a system 800 that includes an illustrative MIGHTR disposed in a trench or similar subterranean structure, in accordance with at least one embodiment described herein.

FIG. 8 is an elevation view of a system 800 that includes an illustrative MIGHTR 100 disposed in a trench 810 or similar subterranean structure, in accordance with at least one embodiment described herein. As depicted in FIG. 8, in some embodiments, at least a portion of the MIGHTR 100 may be disposed in a subterranean vault or trench 810.

Figure 9:
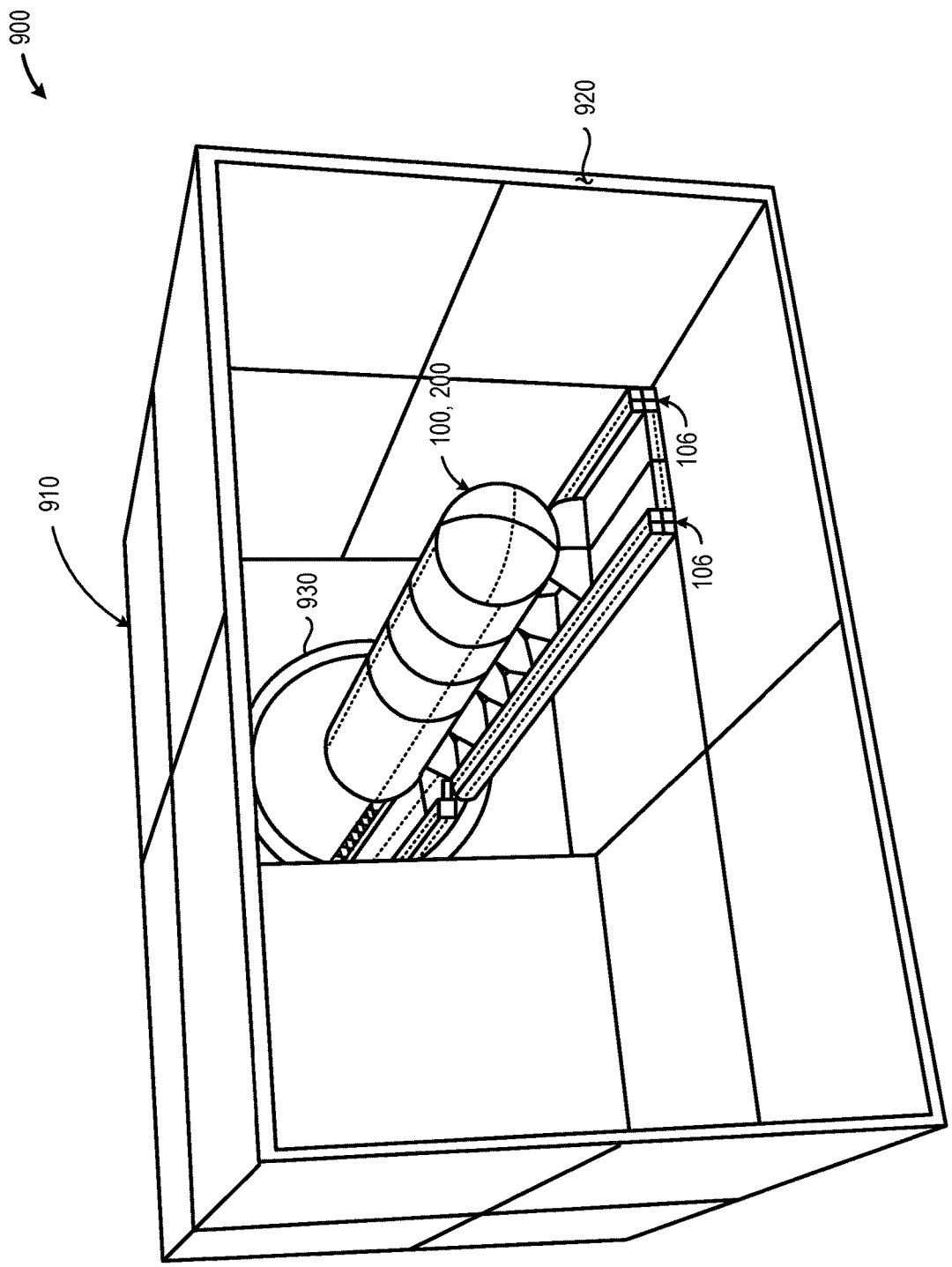
FIG. 9 is an upper perspective view of a system that includes an illustrative MIGHTR disposed in a reactor structure, such as a structure disposed in a geologic formation and enclosed by a structural vault, in accordance with at least one embodiment described herein.

FIG. 9 is an upper perspective view of a system 900 that includes an illustrative MIGHTR 100 disposed in a reactor structure 910, such as a structure disposed in a geologic formation and enclosed by a structural vault 920, in accordance with at least one embodiment described herein. In embodiments, the reactor structure 910 may be constructed above grade and base isolated. In other embodiments, the reactor structure 910 may be semi-embedded within a surface to provide protection from kinetic events impacting the reactor structure (e.g., detonations, vehicle impacts). In embodiments, the MIGHTR 100, fuel storage, fuel handling robots, and repair robots may be disposed in an insulated room. In such embodiments, an entrance to a maintenance room may be disposed on either or both sides of the MIGHTR 100. In embodiments one maintenance room may be used for reactor core assembly 120 maintenance and refueling, and another maintenance room may be used for maintenance, service, and repair of the thermal transfer assembly 180 and coolant gas circulators 150.

In embodiments the guide rails 106 may include structures that are significantly larger than railroad tracks and will likely have a gauge that is larger than traditional railroad tracks. In an example configuration, the vault 920 and reactor housing 930 may have a combined length of about 50 meters and the MIGHTR 100 may have a length of about 35 meters. In such a configuration, a graphite block plus water passive reactor cavity cooling system (RCCS), the diameter of the reactor housing 930 may be about 15 meters or less.

Figure 10:
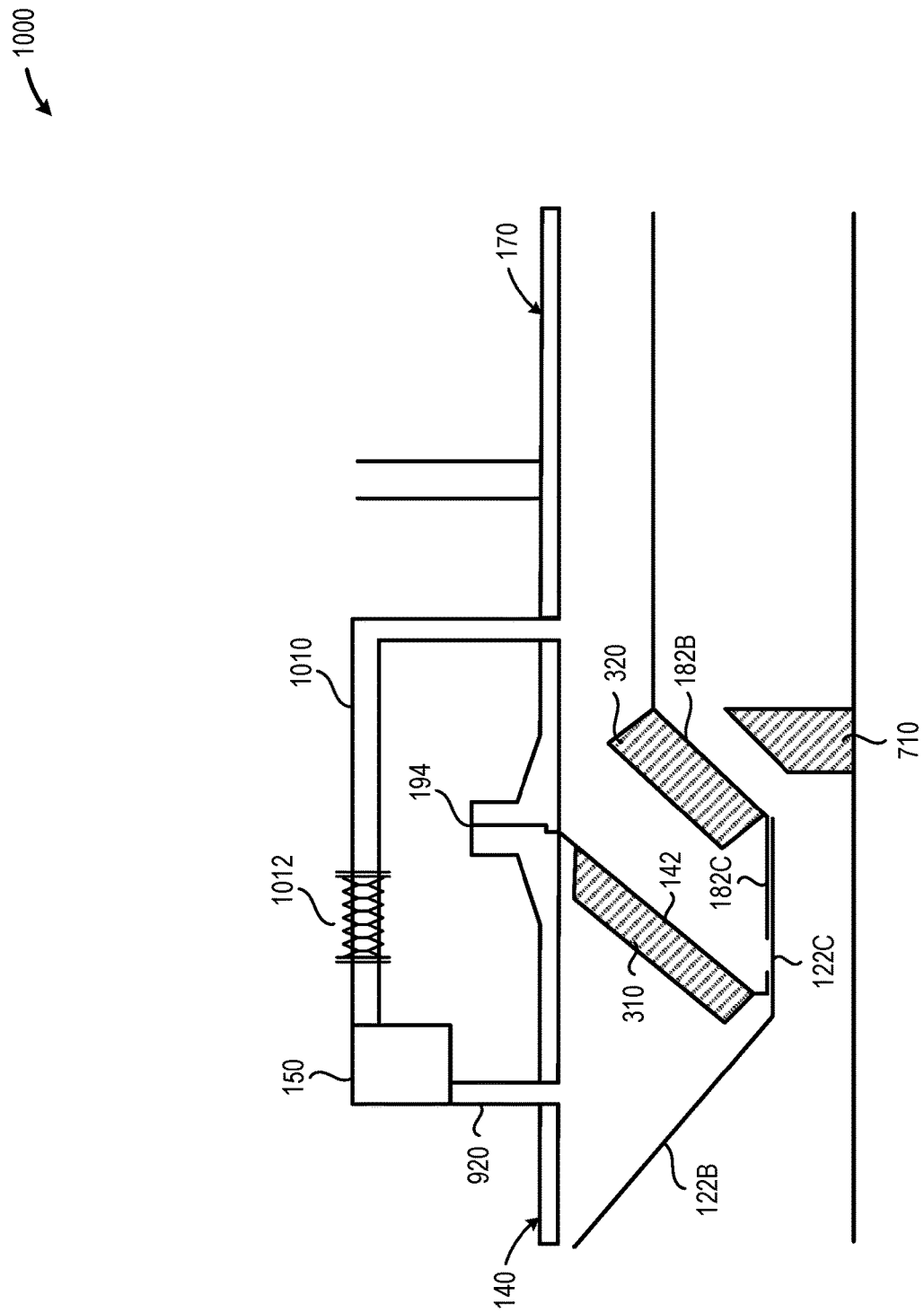
FIG. 10 is a partial cross-sectional elevation of an illustrative system that includes a coolant gas circulator disposed at least partially within the intermediate high-pressure shell portion to draw cooling gas from the second high-pressure shell portion and return the cooling gas to the intermediate high-pressure shell portion where the cooling gas flows into the first high-pressure shell portion, in accordance with at least one embodiment described herein.

FIG. 10 is a partial cross-sectional elevation of an illustrative system 1000 that includes an coolant gas circulator 150 to draw cooling gas 152 from the second high-pressure shell portion 170 and return the cooling gas 152 to the intermediate high-pressure shell portion 140 where the cooling gas flows into the first high-pressure shell portion 110, in accordance with at least one embodiment described herein. In at least some embodiments, the coolant gas circulator 150 such as depicted in FIG. 10 may be used to provide back-up or emergency service in the event the coolant gas circulator 250 disposed in the second high-pressure shell portion 170 fails. In embodiments a plurality of coolant gas circulators 150 (e.g., 8 coolant gas circulators 150A-150H, only 150A depicted in FIG. 10 for clarity) may be disposed at least partially within the high-pressure shell at one or more intermediate locations between the reactor core assembly 120 and the thermal transfer assembly 180. Increasing the number of coolant gas circulators 150 may beneficially reduce the size of each of the coolant gas circulators 150. In embodiments, each of the coolant gas circulators 150 may be physically and/or fluidly coupled across the flange connection 194 between the intermediate high-pressure shell portion 140 and the second high-pressure shell portion 170. In embodiments, the suction 1010 of each of the coolant gas circulators 150 may be fluidly coupled to the second high-pressure shell portion 170 and one or more expansion joints, bellows, or similar structures 1012 may be disposed in the suction line 1010 to provide movement for thermal expansions of the MIGHTR 100. The discharge 1020 of each of the coolant gas circulators 150 discharges into the intermediate high-pressure shell portion 140 on the reactor side of the internal baffle 142.

In embodiments, one or more coolant gas circulators 250 may be disposed in or on the internal surface of the head 190. In such embodiments, the one or more coolant gas circulators 250 may be considered the "primary" gas circulator and the one or more coolant gas circulators 150 may be considered "secondary," "back-up," or "emergency" coolant gas circulation. In embodiments, the coolant gas circulators 150 may be disposed within the reactor vault, however each of the coolant gas circulators 150 may be fluidly isolated from the MIGHTR 100 and removed for service, maintenance, repair, or replacement without shutting down the MIGHTR 100. Although the coolant gas circulator 150 may project from the outside wall of the intermediate high-pressure shell portion 140 by approximately 1 meter, only a marginal increase in the diameter of the reactor vault 920 is needed since the flanges 132, 134, 192, and 194 may project from the outside wall by about 0.6 meters. The horizontal layout of the MIGHTR 100 provides a margin that allows for many variations in refueling operations, such as longer cycles.

In one example, a typical MIGHTR 100 generate approximately 275 Megawatts of electrical output (MWe). The reactor core cooling system at the reactor vault 830, plus base isolation, plus a water tank placed inside the reactor vault 830, may occupy a system volume of approximately 81,250 cubic meters ($m^3$), resulting in 81,250 $m^3$/275 MWe=295 $m^3$/MWe. One of ordinary skill in the relevant arts will readily appreciate that smaller or larger MIGHTR 100 designs may have a lesser or greater thermal output and may occupy commensurately greater or lesser volumes.

The systems and methods disclosed herein provide significant improvements in efficiency. The horizontal configuration of the MIGHTR 100, the reactor core assembly 120, the thermal transfer 180, and the coolant gas circulators 150 are disposed on a single level, minimizing the need for stairs and/or elevators to perform maintenance activities. Additionally, the need for cranes or similar lifting apparatuses to perform maintenance and/or repair activities is reduced or eliminated. Advantageously, having all of the MIGHTR components in horizontal alignment and linearly displaceable along guide rails positioned beneath the MIGHTR 100, at the level of the horizontal midplane of the MIGHTR 100 or at some level in between, increases the space utilization efficiency within the reactor vault 830 and the reactor structure 820. The use of guide rails 106 also accommodates axial thermal expansion of the MIGHTR 100. At times, a vertical thermal gradient may exist between the upper portion of the MIGHTR 100 and the lower portion of the MIGHTR 100, under normal operating conditions such gradients should be minimal as the coolant gas circulates through the reactor core assembly 120. In the event of a coolant gas failure, the resultant vertical thermal gradient may be dependent upon at least the layout of thermal resistances/insulation disposed inside and/or outside the first high-pressure shell portion 110.

A beneficial redundancy exists with the coolant gas circulators 150. When one or more of the plurality of coolant gas circulators 150 fails or is taken out of service, the remaining coolant gas circulators 150 will continue to circulate coolant gas, such as helium, through the reactor core assembly 120. In embodiments, an additional cooling system may be employed—such systems may be active or passive. There also is an outer cooling system, that can be either active with air or passive: RCCS. This last one could have natural circulation. For example, using a MIGHTR 100 having a 6 meter diameter, approximately 8-10 meters of good radiation. Those heating 8-10 m are enough for little chimneys full of water heating up and pushing the rest of the water in the circuit. The heat travels from the core barrel 122 to the surrounding first high-pressure shell portion 110 mainly by radiation, and there is also a bit of conduction through the many axially guiding fingers that support the core barrel 122 within the surrounding first high-pressure shell portion 110.

The finger members 126A-126D are disposed in the flow of coolant gas 152 returning to the reactor core assembly 120, minimizing the likelihood of hotspot formation on the first high-pressure shell portion 110. However, if the flow of coolant gas were halted, the finger members 126A-126D may create hotspots on the first high-pressure shell portion 110. In embodiments, the first high-pressure shell portion 110 may reach a temperature of about 500° C. due mainly to radiation and the hot spots proximate the finger members 126A-126D may reach a temperature of no more than about 550° C. In embodiments, the location of the finger members 126A-126D (and consequently any hotspots) may be location such that the hotspots do not present or cause a significant structural load. In embodiments, reactor pressurization and coolant gas flow may be provided as inputs to a reactor control system. If the control system detects an absence of coolant gas flow, the control system may depressurize the MIGHTR 100 to reduce the mechanical load at the hotspots.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Thus, the present disclosure is directed to systems and methods useful for the construction and operation of a Modular Integrated Gas High-Temperature Reactor (MIGHTR). The MIGHTR includes a reactor core assembly disposed in a first high-pressure shell portion, a thermal transfer assembly disposed in a second high-pressure shell portion, and an intermediate high-pressure shell portion connecting the first and the second high-pressure shell portions. Coolant gas flows through the reactor core assembly, through the intermediate high-pressure shell portion and into the thermal transfer assembly where the temperature of the coolant gas is reduced. A baffle disposed in the intermediate high-pressure shell portion prevents the direct flow of coolant gas from the thermal transfer assembly to the reactor core assembly, instead a plurality of coolant gas circulators draw the cooled coolant gas from the thermal transfer assembly and circulate the cooled coolant gas through the reactor core assembly.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for providing a horizontally arranged modular integrated gas high-temperature nuclear reactor.

According to example 1, there is provided A high temperature gas reactor. The reactor may include a first high-pressure shell portion having a horizontal first longitudinal axis, the first high-pressure shell portion to accommodate a slidable insertion of at least a portion of a reactor core assembly disposed at least partially in a core barrel, such that in operation the coolant gas enters the reactor core assembly at a first temperature and exits the reactor core assembly at a second temperature greater than the first temperature; a second high-pressure shell portion having a horizontal second longitudinal axis, the second high-pressure shell portion to accommodate insertion of at least portion of a thermal transfer assembly disposed at least partially in a flow separation barrel to receive the coolant gas at the second temperature from the reactor core assembly and cool the coolant gas to the first temperature; and at least one coolant gas circulator to receive the coolant gas at the first temperature and cause the coolant gas to return to the reactor core assembly.

Example 2 may include elements of example 1 where the core barrel comprises: a first cylindrical portion having a first diameter to receive the reactor core assembly; a core grid disposed transversely across the first diameter; a frustoconical portion coupled to the first cylindrical portion; and a second cylindrical portion having a second diameter coupled to the frustoconical portion, the second diameter smaller than the first diameter.

Example 3 may include elements of any of examples 1 or 2 where the flow separation barrel comprises: a first cylindrical portion having a first diameter to receive the thermal transfer assembly; a frustoconical portion coupled to the first cylindrical portion; a second cylindrical portion having a second diameter coupled to the frustoconical portion, the second diameter smaller than the first diameter.

Example 4 may include elements of any of examples 1 through 3 and the reactor may further include: at least one physical connector to physically couple the first high-pressure shell portion to the second high-pressure shell portion.

Example 5 may include elements of any of examples 1 through 4 and the reactor may further include: a gas-tight flexible connection, such as bellows, coupling the second cylindrical portion of the core barrel to the second cylindrical portion of the flow separation barrel.

Example 6 may include elements of any of examples 1 through 5 and the reactor may further include: an intermediate high-pressure shell portion having a first end physically couplable to the first high-pressure shell portion and a second end physically couplable to the second high-pressure shell portion, the intermediate high-pressure shell portion including a central aperture to permit the unidirectional flow of gas the second temperature from the reactor core assembly to the thermal transfer assembly and an annular baffle surrounding the central aperture, the annular baffle to direct the flow of coolant gas at the first temperature from the second high-pressure shell portion to the first high-pressure shell portion.

Example 7 may include elements of any of examples 1 through 6 and the reactor may further include: one or more axially guided supports disposed internally within the first high-pressure shell portion; wherein the first high-pressure shell portion includes a removeable head portion to permit the slidable extraction of at least a portion of the reactor core assembly from the first high-pressure shell portion via the one or more axially guided supports.

Example 8 may include elements of any of examples 1 through 7 and the reactor may further include: at least one linear displacement system physically coupled to at least a portion of an external surface of at least one of: the first high-pressure shell portion or the second high-pressure shell portion, the linear displacement system to permit the displacement of at least one of: the first high-pressure shell portion to permit access to the reactor core assembly or the second high-pressure shell portion to permit access to the thermal transfer assembly.

Example 9 may include elements of any of examples 1 through 8 where the thermal transfer assembly comprises a steam generator.

Example 10 may include elements of any of examples 1 through 9 where the steam generator comprises a helical coil steam generator disposed about at least a portion of an external surface of the first cylindrical portion of the flow separation barrel.

Example 11 may include elements of any of examples 1 through 10 where the steam generator comprises a vertical tube steam generator disposed at least partially within an internal volume of the first cylindrical portion of the flow separation barrel.

Example 12 may include elements of any of examples 1 through 11 and the reactor may further include: a flow separation baffle disposed at least partially within the flow separation barrel, proximate a terminal end of the hollow cylindrical member included in the core barrel, the flow separation baffle to distribute the cooling gas at the second temperature about at least a portion of the internal perimeter of the flow separation barrel.

Example 13 may include elements of any of examples 1 through 12 where the flow separation baffle comprises at least one of: a gamma radiation absorbing layer disposed on or about at least a portion of at least one surface of the flow separation baffle or a neutron absorbing layer disposed on or about at least a portion of at least one surface of the flow separation baffle.

Example 14 may include elements of any of examples 1 through 13 where the at least one coolant gas circulator comprises at least one coolant gas circulator disposed in an internal space of the second high-pressure shell portion.

Example 15 may include elements of any of examples 1 through 14 where the at least one gas circulator is disposed external to the first high-pressure shell portion and the second high-pressure shell portion.

Example 16 may include elements of any of examples 1 through 15 where at least one gas circulator fluidly couples via a flange connection to the second high-pressure shell portion.

Example 17 may include elements of any of examples 1 through 16 where the first longitudinal axis of the first high-pressure shell portion and the second longitudinal axis of the second high-pressure shell portion are collinear and horizontal.

Example 18 may include elements of any of examples 1 through 17 where the first longitudinal axis of the first high-pressure shell portion and the second longitudinal axis of the second high-pressure shell portion are displaced less than 10° from horizontal.

Example 19 may include elements of any of examples 1 through 18 and the reactor may further include: a plurality of barrel stand-off members physically coupled to an external surface of the first cylindrical portion of the barrel, the barrel stand-off members to provide a gap between the external surface of the first cylindrical portion of the barrel and an internal surface of the first high-pressure shell portion.

Example 20 may include elements of any of examples 1 through 19 where the plurality of barrel stand-off members comprise stand-off members physically affixed to the external surface of the first cylindrical portion of the barrel and slidably displaceable along the internal surface of the first high-pressure shell portion.

Example 21 may include elements of any of examples 1 through 20 where the plurality of barrel stand-off members comprise stand-off members physically affixed to the internal surface of the first high-pressure shell portion and slidably displaceable along the external surface of the first cylindrical portion of barrel.

Example 22 may include elements of any of examples 1 through 21 and the reactor may further include: a plurality of flow separation barrel stand-off members 290A, 290B physically coupled to an external surface of the first cylindrical portion of the flow separation barrel, the flow separation barrel stand-off members 290A, 290B to provide a gap between the external surface of the first cylindrical portion of the flow separation barrel and an internal surface of the second high-pressure shell portion.

Example 23 may include elements of any of examples 1 through 22 where the plurality of flow separation barrel stand-off members 290A, 290B comprise stand-off members physically affixed to the external surface of the first cylindrical portion of the flow separation barrel and slidably displaceable along the internal surface of the second high-pressure shell portion.

Example 24 may include elements of any of examples 1 through 23 where the plurality of flow separation barrel stand-off members comprise stand-off members physically affixed to the internal surface of the second high-pressure shell portion and slidably displaceable along the external surface of the first cylindrical portion of the flow separation barrel.

Example 25 may include elements of any of examples 1 through 24 where the high-pressure shell portions have one or more features to allow a displacement of at least one of: the first high-pressure shell portion along the first longitudinal axis or the second high-pressure shell portion along the second longitudinal axis, the one or more features to provide at least one of: a connection to support rollers, one or more connectors to connect to one or more rotatable elements, one or more conformal surfaces to allow sliding, one or more connectors to connect to a conformal surface to allow sliding, one or more axial guides, and one or more connectors to connect to axial guides.

Example 26 may include elements of any of examples 1 through 25 and the reactor may further include: one or more stop elements to stop axially at least one of: the first high-pressure shell portion or the second high-pressure shell portion to a fixed point on a support structure, the one or more stop elements including at least one of: one or more shear keys or one or more tie rod anchor elements.

Example 27 may include elements of any of examples 1 through 26 and the reactor may further include: one or more tensioner connection features operably coupled to at least one of: the first high-pressure shell portion or the second high-pressure shell portion, the one or more tensioner connection features including at least one of: one or more shear keys or one or more lugs to permit coupling one or more tensioners affixed to the support structure to at least one of: the first high-pressure shell portion or the second high-pressure shell portion.

According to example 28, there is provided a high temperature gas reactor system. The system may include: a first high-pressure shell portion having a substantially horizontal first longitudinal axis, the first high-pressure shell portion to accommodate a slidable insertion of at least a portion of a reactor core assembly disposed at least partially in a core barrel, such that in operation the coolant gas enters the reactor core assembly at a first temperature and exits the reactor core assembly at a second temperature greater than the first temperature; a second high-pressure shell portion having a substantially horizontal second longitudinal axis, the second high-pressure shell portion to accommodate insertion of at least portion of a thermal transfer assembly disposed at least partially in a flow separation barrel to receive the coolant gas at the second temperature from the reactor core assembly and cool the coolant gas to the first temperature; at least one coolant gas circulator to receive the coolant gas at the first temperature and cause the coolant gas to return to the reactor core assembly; and one or more support elements coupled to at least one of the first high-pressure shell portion and the second high-pressure shell portion, the one or more support elements to permit the axial displacement of at least one of: the first high-pressure shell portion along the first longitudinal axis and the second high-pressure shell portion along the second longitudinal axis.

According to example 29, there is provided a method of assembling a high temperature gas reactor system. The method may include: axially displacing a first high-pressure shell portion along a substantially horizontal first longitudinal axis, the first high-pressure shell portion including: at least a portion of a reactor core assembly disposed at least partially in a core barrel; and a first support element physically coupled to the first high-pressure shell portion, the first support element displaceable with respect to at least a portion of an underlying support structure disposed beneath the first high-pressure shell portion; axially displacing a second high-pressure shell portion along a substantially horizontal second longitudinal axis, the second high-pressure shell portion including: at least portion of a thermal transfer assembly disposed at least partially in a flow separation barrel; and a second support element physically coupled to the second high-pressure shell portion, the second support element displaceable with respect to at least a portion of the underlying support structure disposed beneath the second high-pressure shell portion.

Example 30 may include elements of example 29 where the first support element includes at least one rotating element and the second support element includes at least one rotating element; where axially displacing the first high-pressure shell portion along the substantially horizontal first longitudinal axis comprises: rolling the at least one rotating element included in the first support element along a substantially horizontal rail disposed at least partially beneath the first high-pressure shell portion; and where axially displacing the second high-pressure shell portion along the substantially horizontal second longitudinal axis comprises: rolling the at least one rotating element included in the second support element along a substantially horizontal rail disposed at least partially beneath the second high-pressure shell portion.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A high temperature gas reactor, comprising:
    a first high-pressure shell portion having a substantially horizontal first longitudinal axis, the first high-pressure shell portion to accommodate a slidable insertion of at least a portion of a reactor core assembly disposed at least partially in a core barrel, the reactor core assembly having a first end and a second end disposed along the substantially horizontal first longitudinal axis, such that in operation a coolant gas enters the first end of the reactor core assembly at a first temperature and exits the second end of the reactor core assembly at a second temperature greater than the first temperature;
    a second high-pressure shell portion having a substantially horizontal second longitudinal axis, the second high-pressure shell portion to accommodate insertion of at least portion of a thermal transfer assembly disposed at least partially in a flow separation barrel, the thermal transfer assembly having a first end and a second end disposed along the substantially horizontal second longitudinal axis, such that in operation the coolant gas at the second temperature from the reactor core assembly enters the first end of the thermal transfer assembly at the second temperature and exits the second end of the thermal transfer assembly at the first temperature; and
    at least one coolant gas circulator to receive the coolant gas at the first temperature and cause the coolant gas to return to the reactor core assembly.

2. The reactor of claim 1 wherein the core barrel comprises:
    a first cylindrical portion having a first diameter to receive the reactor core assembly;
    a core grid disposed transversely across the first diameter;
    a frustoconical portion coupled to the first cylindrical portion; and
    a second cylindrical portion having a second diameter coupled to the frustoconical portion, the second diameter smaller than the first diameter.

3. The reactor of claim 2 wherein the flow separation barrel comprises:
    a first cylindrical portion having a first diameter to receive the thermal transfer assembly;
    a frustoconical portion coupled to the first cylindrical portion;
    a second cylindrical portion having a second diameter coupled to the frustoconical portion, the second diameter smaller than the first diameter.

4. The reactor of claim 3, further comprising:
    at least one physical connector to physically couple the first high-pressure shell portion to the second high-pressure shell portion.

5. The reactor of claim 4, further comprising:
    a gas-tight flexible connection coupling the second cylindrical portion of the core barrel to the second cylindrical portion of the flow separation barrel.

6. The reactor of claim 1, further comprising:
    an intermediate high-pressure shell portion having a first end physically couplable to the first high-pressure shell portion and a second end physically couplable to the second high-pressure shell portion, the intermediate high-pressure shell portion including a central aperture to permit the unidirectional flow of gas the second temperature from the reactor core assembly to the thermal transfer assembly and an annular baffle surrounding the central aperture, the annular baffle to direct the flow of coolant gas at the first temperature from the second high-pressure shell portion to the first high-pressure shell portion.

7. The reactor of claim 1 further comprising:
    one or more axially guided supports disposed internally within the first high-pressure shell portion;
    wherein the first high-pressure shell portion includes a removeable head portion to permit the slidable extraction of at least a portion of the reactor core assembly from the first high-pressure shell portion via the one or more axially guided supports.

8. The reactor of claim 1 further comprising:
    at least one linear displacement system physically coupled to at least a portion of an external surface of at least one of: the first high-pressure shell portion or the second high-pressure shell portion, the linear displacement system to permit the displacement of at least one of: the first high-pressure shell portion to permit access to the reactor core assembly or the second high-pressure shell portion to permit access to the thermal transfer assembly.

9. The reactor of claim 1 wherein the thermal transfer assembly comprises a steam generator.

10. The reactor of claim 9 wherein the steam generator comprises a helical coil steam generator disposed about at least a portion of an external surface of the first cylindrical portion of the flow separation barrel.

11. The reactor of claim 1 wherein the thermal transfer assembly comprises a vertical tube steam generator disposed at least partially within an internal volume of a first cylindrical portion of the flow separation barrel.

12. The reactor of claim 1 further comprising a flow separation baffle disposed at least partially within the flow separation barrel, proximate a terminal end of a hollow cylindrical member included in the core barrel, the flow separation baffle to distribute the cooling gas at the second temperature about at least a portion of the internal perimeter of the flow separation barrel.

13. The reactor of claim 1 wherein the flow separation baffle comprises at least one of: a gamma radiation absorbing layer disposed on or about at least a portion of at least one surface of the flow separation baffle or a neutron absorbing layer disposed on or about at least a portion of at least one surface of the flow separation baffle.

14. The reactor of claim 1 wherein the at least one coolant gas circulator is disposed at least partially in an internal space of the second high-pressure shell portion.

15. The reactor of claim 1 wherein the at least one gas circulator is disposed external to the first high-pressure shell portion and the second high-pressure shell portion.

16. The reactor of claim 12 wherein the at least one gas circulator fluidly couples via a flange connection to the second high-pressure shell portion.

17. The reactor of claim 1 wherein the first longitudinal axis of the first high-pressure shell portion and the second longitudinal axis of the second high-pressure shell portion are collinear and horizontal.

18. The reactor of claim 1 wherein the first longitudinal axis of the first high-pressure shell portion and the second longitudinal axis of the second high-pressure shell portion are displaced less than 10° from horizontal.

19. The reactor of claim 1 further comprising:
a plurality of core barrel stand-off members coupled between the core barrel and the first high-pressure shell portion, the core barrel stand-off members to provide a gap between the external surface of the core barrel and an internal surface of the first high-pressure shell portion.

20. The reactor of claim 19 wherein the plurality of core barrel stand-off members comprise finger members physically affixed to the core barrel and slidably displaceable along the first high-pressure shell portion.

21. The reactor of claim 19 wherein the plurality of barrel stand-off members comprise stand-off members physically affixed to the internal surface of the first high-pressure shell portion and slidably displaceable along the external surface of the first cylindrical portion of the barrel.

22. The reactor of claim 1 further comprising:
a plurality of flow separation barrel stand-off members coupled between the flow separation barrel and the second high-pressure shell portion, the flow separation barrel stand-off members to provide a gap between the external surface of the flow separation barrel and an internal surface of the second high-pressure shell portion.

23. The reactor of claim 22 wherein the plurality of flow separation barrel stand-off members comprise stand-off members physically affixed to the flow separation barrel and slidably displaceable along the internal surface of the second high-pressure shell portion.

24. The reactor of claim 22 wherein the plurality of flow separation barrel stand-off members comprise stand-off members physically affixed to the internal surface of the second high-pressure shell portion and slidably displaceable along the external surface of the first cylindrical portion of the flow separation barrel.

25. The reactor of claim 1 further comprising one or more features to allow a displacement of at least one of: the first high-pressure shell portion along the first longitudinal axis or the second high-pressure shell portion along the second longitudinal axis, the one or more features to provide at least one of: a connection to support rollers, one or more connectors to connect to one or more rotatable elements, one or more conformal surfaces to allow sliding, one or more connectors to connect to a conformal surface to allow sliding, one or more axial guides,
and one or more connectors to connect to axial guides.

26. The reactor of claim 25 further comprising one or more axial stop elements to axially stop at least one of: the first high-pressure shell portion or the second high-pressure shell portion to a fixed point, the one or more stop elements including at least one of: one or more shear keys or one or more tie rod anchor elements.

27. The reactor of claim 25 further comprising one or more tensioner connection features operably coupled to at least one of: the first high-pressure shell portion or the second high-pressure shell portion, the one or more tensioner connection features including at least one of: one or more shear keys or one or more lugs to permit coupling one or more tensioners affixed to the support structure to at least one of: the first high-pressure shell portion or the second high-pressure shell portion.

28. A high temperature gas reactor system, comprising:
a first high-pressure shell portion having a substantially horizontal first longitudinal axis, the first high-pressure shell portion to accommodate a slidable insertion of at least a portion of a reactor core assembly disposed at least partially in a core barrel, the reactor core assembly having a first end and a second end disposed along the substantially horizontal first longitudinal axis, such that in operation Mena coolant gas enters the first end of the reactor core assembly at a first temperature and exits the second end of the reactor core assembly at a second temperature greater than the first temperature;
a second high-pressure shell portion having a substantially horizontal second longitudinal axis, the second high-pressure shell portion to accommodate insertion of at least portion of a thermal transfer assembly disposed at least partially in a flow separation barrel, the thermal transfer assembly having a first end and a second end disposed along the substantially horizontal second longitudinal axis, such that in operation the coolant gas at the second temperature from the reactor core assembly enters the first end of the thermal transfer assembly at the second temperature and exits the second end of the thermal transfer assembly at the first temperature;
at least one coolant gas circulator to receive the coolant gas at the first temperature and cause the coolant gas to return to the reactor core assembly;
one or more support elements coupled to at least one of the first high-pressure shell portion and the second high-pressure shell portion, the one or more support elements to permit the axial displacement of at least one of: the first high-pressure shell portion along the first longitudinal axis and the second high-pressure shell portion along the second longitudinal axis.

29. A method of assembling the high temperature gas reactor system of claim 1, the method comprising:
axially displacing the first high-pressure shell portion along the substantially horizontal first longitudinal axis, the first high-pressure shell portion including first support element physically coupled to the first high-pressure shell portion, the first support element displaceable with respect to at least a portion of an underlying support structure disposed at least partially beneath the first high-pressure shell portion;

axially displacing the second high-pressure shell portion along the substantially horizontal second longitudinal axis, the second high-pressure shell portion including a second support element physically coupled to the second high-pressure shell portion, the second support element displaceable with respect to at least a portion of the underlying support structure disposed at least partially beneath the second high-pressure shell portion.

30. The method of claim 29:

wherein the first support element includes at least one rotating element and the second support element includes at least one rotating element;

wherein axially displacing the first high-pressure shell portion along the substantially horizontal first longitudinal axis comprises: rolling the at least one rotating element included in the first support element along a substantially horizontal rail disposed at least partially beneath the first high-pressure shell portion; and wherein axially displacing the second high-pressure shell portion along the substantially horizontal second longitudinal axis comprises: rolling the at least one rotating element included in the second support element along a substantially horizontal rail disposed at least partially beneath the second high-pressure shell portion.

31. A high temperature gas reactor, comprising:

a first high-pressure shell portion having a substantially horizontal first longitudinal axis, the first high-pressure shell portion to accommodate a slidable insertion of at least a portion of a reactor core assembly disposed at least partially in a core barrel, such that in operation the coolant gas enters the reactor core assembly at a first temperature and exits the reactor core assembly at a second temperature greater than the first temperature, the core barrel comprising a first cylindrical portion having a first diameter to receive the reactor core assembly, a core grid disposed transversely across the first diameter, a frustoconical portion coupled to the first cylindrical portion, and a second cylindrical portion having a second diameter coupled to the frustoconical portion, the second diameter smaller than the first diameter;

a second high-pressure shell portion having a substantially horizontal second longitudinal axis, the second high-pressure shell portion to accommodate insertion of at least portion of a thermal transfer assembly disposed at least partially in a flow separation barrel to receive the coolant gas at the second temperature from the reactor core assembly and cool the coolant gas to the first temperature, the flow separation barrel comprising a first cylindrical portion having a first diameter to receive the thermal transfer assembly, a frustoconical portion coupled to the first cylindrical portion, a second cylindrical portion having a second diameter coupled to the frustoconical portion, the second diameter smaller than the first diameter;

at least one coolant gas circulator to receive the coolant gas at the first temperature and cause the coolant gas to return to the reactor core assembly;

at least one physical connector to physically couple the first high-pressure shell portion to the second high-pressure shell portion; and a gas-tight flexible connection coupling the second cylindrical portion of the core barrel to the second cylindrical portion of the flow separation barrel.

* * * * *